US008705325B2

(12) United States Patent
Matsumoto

(10) Patent No.: US 8,705,325 B2
(45) Date of Patent: Apr. 22, 2014

(54) THERMAL-ASSISTED MAGNETIC RECORDING HEAD CAPABLE OF SUPRESSING THE TEMPERATURE RISE OF SCATTERER

(75) Inventor: Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 12/910,998

(22) Filed: Oct. 25, 2010

(65) Prior Publication Data

US 2011/0096639 A1 Apr. 28, 2011

(30) Foreign Application Priority Data

Oct. 26, 2009 (JP) .................................. 2009-245412

(51) Int. Cl.
G11B 11/00 (2006.01)

(52) U.S. Cl.
USPC ..................................... 369/13.33; 369/13.13

(58) Field of Classification Search
USPC ........ 369/13.33, 13.32, 13.13, 13.02, 112.09, 369/112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| 6,768,556 | B1 | 7/2004 | Matsumoto et al. | |
| 8,130,598 | B2* | 3/2012 | Matsumoto et al. | ....... 369/13.33 |
| 2004/0085862 | A1 | 5/2004 | Matsumoto et al. | |
| 2005/0078565 | A1* | 4/2005 | Peng et al. | ................. 369/13.32 |
| 2010/0103553 | A1* | 4/2010 | Shimazawa et al. | ....... 369/13.33 |
| 2010/0118431 | A1* | 5/2010 | Tomikawa et al. | .............. 360/59 |
| 2010/0142079 | A1* | 6/2010 | Tanaka et al. | ................... 360/59 |
| 2010/0149930 | A1* | 6/2010 | Komura et al. | ............ 369/13.33 |
| 2010/0172220 | A1* | 7/2010 | Komura et al. | ............ 369/13.33 |
| 2010/0238580 | A1* | 9/2010 | Shimazawa et al. | ............ 360/59 |
| 2011/0292774 | A1* | 12/2011 | Osawa et al. | ............. 369/13.33 |
| 2012/0113771 | A1* | 5/2012 | Matsumoto | ............... 369/13.33 |

FOREIGN PATENT DOCUMENTS

| JP | 2001-255254 | 9/2001 |
| JP | 2004-151046 | 5/2004 |
| JP | 2005-116155 | 4/2005 |
| JP | 2010-108584 | 5/2010 |

OTHER PUBLICATIONS

Hideki Saga et al., New Recording Method Combining Thermo-Magnetic Writing and Flux Detection, Japanese Journal of Applied Physics, Mar. 1999, pp. 1839-1840, vol. 38, Part 1, No. 3B.

* cited by examiner

*Primary Examiner* — Tan X Dinh
(74) *Attorney, Agent, or Firm* — Antonelli, Terry, Stout & Kraus, LLP.

(57) ABSTRACT

The present invention suppresses temperature rise of an optical near-field generator while increasing optical near-field intensity in a thermally assisted magnetic recording head using a conductive scatterer as the optical near-field generator. The present invention uses a conductive scatterer having a cross-sectional shape in which its width is gradually reduced toward an apex where an optical near-field is generated, and also has a shape in which its width is reduced gradually or in a stepwise fashion toward the apex where the optical near-field is generated in a traveling direction of incident light.

19 Claims, 35 Drawing Sheets

THERMAL-ASSISTED MAGNETIC RECORDING HEAD CAPABLE OF SUPRESSING THE TEMPERATURE RISE OF SCATTERER

CLAIM OF PRIORITY

The present application claims priority from Japanese patent application JP 2009-245412 filed on Oct. 26, 2009, the content of which is hereby incorporated by reference into this application.

BACKGROUND OF THE INVENTION

1. Field of the Invention

The present invention relates to an optical near-field generating device, a magnetic recording head including an optical near-field generating unit, and a magnetic recording device using the same.

2. Description of the Related Art

A thermally assisted recording method has recently been proposed as a recording method for achieving a recording density of 1 $Tb/in^2$ or higher (H. Saga, H. Nemoto, H. Sukeda, and M. Takahashi, Jpn. J. Appl. Phys., 38, Part 1, 1839 (1999)). With a recording density of 1 $Tb/in^2$ or higher, conventional magnetic recording devices have a problem that thermal fluctuations destroy recorded information. The prevention of this requires enhancement of coercivity of a magnetic recording medium. Too high a coercivity, however, makes it impossible to form a recording bit on the medium because there is a limit to the magnitude of a magnetic field that a recording head can generate. To address this, the thermally assisted recording method involves heating the medium with light, thereby reducing the coercivity at the instant of recording. This makes it possible to perform recording on media with high coercivity, and thus to achieve a recording density of 1 $Tb/in^2$ or higher.

For the thermally assisted recording device, it is necessary that the spot diameter of light to be radiated be substantially equivalent to the size of the recording bit (e.g., several 10 nm). The reason is that the spot diameter of light in excess of several 10 nm erases information on an adjacent track. To heat such a minute region, an optical near-field is used. The optical near-field is a localized electromagnetic field (the light whose wave number has imaginary components) that is present in the vicinity of a minute object whose size is equal to or smaller than wavelengths of light. A microaperture having a diameter equal to or smaller than the wavelengths of light or a metal scatterer is used to generate the optical near-field. For example, JP2001-255254A proposes an optical near-field generating unit using a metal scatterer of a triangular shape as a high-efficiency optical near-field generating unit. When light is made incident on the metal scatterer, plasmon resonance is excited in the metal scatterer, and a strong optical near-field is generated at an apex of the triangle. Using this optical near-field generating unit makes it possible to focus light with high efficiency on a region equal to or smaller than several 10 nm. Meanwhile, JP2004-151046A proposes a structure in which a surface, on a slider floating surface side, of the metal scatterer is shaved to form a dent in a portion other than the apex where the optical near-field is generated. This structure can reduce the width of intensity distribution of the optical near-field generated at the apex, and thus can suppress generation of a weak optical near-field (background light) generated on the side opposite to the apex.

Patent Document 1: JP2001-255254A
Patent Document 2: JP2004-151046A
Non-Patent Document 1: Jpn. J. Appl. Phys., 38, Part 1, 1839 (1999)

SUMMARY OF THE INVENTION

In the optical near-field generating unit using the metal scatterer, the scatterer, when irradiated with light, absorbs the light and the temperature of the scatterer rises. Therefore, when the light irradiation is continued for a long period of time, a change in shape of the scatterer, occurrence of cracks in the scatterer, and the like due to the temperature rise lead to deterioration of the scatterer, resulting in lowered efficiency in the generation of the optical near-field.

It is an object of the present invention to suppress temperature rise of a scatterer.

To achieve the foregoing object, the present invention uses, as a means for generating optical near-field, a scatterer which is (1) conductive, (2) formed in a shape such as a triangular shape, which is, when viewed from a floating surface side, gradually reduced in width toward the apex where the optical near-field is generated, and (3) formed in a shape which is, when viewed from the side of a slider, increased in width in an upper part of the scatterer (i.e., on the side opposite to the slider floating surface). The upper part of the scatterer is increased in width in a direction perpendicular to the polarization direction of irradiation light.

The upper part of the scatterer is gradually reduced in width toward the bottom part of the scatterer (i.e., a tapered portion is provided), thereby focusing plasmons generated in a wide portion of the upper part of the scatterer on the bottom part of the scatterer. As a result, intensity of optical near-field to be generated can be increased. In this event, setting a spread angle of the tapered portion to 65 degrees or less can obtain higher optical near-field intensity than that when the upper part of the scatterer is not increased in width. Further, setting the spread angle between 20 degrees and 50 degrees can achieve light use efficiency (a ratio of power of light incident on the scatterer to an amount of heat absorbed by a recording medium) of 5% or more, which is required to achieve a recording density of 1.5 $Tb/in^2$ or higher.

As described above, optical near-field use efficiency is enhanced by increasing the width of the upper part of the scatterer. Accordingly, required intensity of incident light can be reduced. Further, the volume of the scatterer can be increased, and thus radiation properties are improved. For these reasons, temperature rise of an optical near-field generating unit can be suppressed.

A recording magnetic field is generated by a magnetic head including a coil and a pole, and the scatterer is disposed near a main pole of the magnetic head. The incident light is guided using a waveguide disposed in the upper part of the scatterer, so that light emitted from the waveguide hits against the upper part of the scatterer.

The upper part of the scatterer may be further increased in width so that the width thereof becomes equal to or larger than the wavelength of the incident light. This increase in width of the upper part of the scatterer allows the light emitted from the waveguide to be collected over a wider range, thus making it possible to further increase the optical near-field intensity. At the same time, the volume of the scatterer can be considerably increased, and thus the radiation properties are improved. Thus, the temperature rise of the optical near-field generating unit can be further suppressed.

The optical near-field intensity is gradually reduced with the increase in height (width in a direction perpendicular to the slider floating surface) of the scatterer having the upper part increased in width. A first inflection point is located at a position where the height of the scatterer reaches $0.612\lambda+66$ (nm), where the wavelength is $\lambda$. A second inflection point is located at a position where the height of the scatterer reaches $\lambda$. To achieve a recording density of 1.5 Tb/in² or higher, the height of the scatterer is preferably at the same level as or lower than the second inflection point. To achieve a recording density of 2.5 Tb/in² or higher, the height of the scatterer is preferably at the same level as or lower than the first inflection point.

A distance from the slider floating surface to the portion increased in width has an optimum value, and the optical near-field intensity can be increased by setting the distance within that range. The distance is preferably within a range between $(0.039\lambda+157)$ $\{-0.778\times(n-1.63)+1\}$ and $96.52$ $\{-0.778\times(n-1.63)+1\}e^{0.0015\lambda}$, where a refractive index of the material of the periphery of the scatterer is n, and the unit is nm.

When the upper part of the scatterer is increased in width, a protrusion may be formed in a lower part of the portion increased in width. In this case, the optical near-field intensity can be increased by adjusting a distance from the center of the scatterer to the end of the projecting portion. The distance is preferably within a range between $(0.369\lambda+167)$ $\{-1.33\times(n-1.63)+1\}$ and $(0.821\lambda-361)$ $\{-1.33\times(n-1.63)+1\}$, where the unit is nm.

When the upper part of the scatterer is increased in width and a protrusion is formed in the lower part of the portion increased in width, the optical near-field intensity is gradually reduced, as with the case of no protrusion, with the increase in height (width in the direction perpendicular to the slider floating surface) of the scatterer. A first inflection point is located at a position where the height of the scatterer reaches $0.612\lambda+66$ (nm), where the wavelength is $\lambda$. A second inflection point is located at a position where the height of the scatterer reaches $\lambda$. To achieve a recording density of 2.5 Tb/in² or higher, the height of the scatterer is preferably at the same level as or lower than the second inflection point. To achieve a recording density of 4 Tb/in² or higher, the height of the scatterer is preferably at the same level as or lower than the first inflection point.

The protrusion formed in the lower part of the portion increased in width preferably has a protruding amount of 50 nm or more, in order to increase the optical near-field intensity. A distance between the lower part of the projecting portion and the slider floating surface is preferably set to 10 nm or more, so that a medium is prevented from being heated in the lower part of the projecting portion. The projecting portion may be configured to partially come into contact with the slider floating surface. Thereby, heat generated in the scatterer escapes into the air between the slider and the medium, and thus temperature rise of the scatterer can be avoided. In this case, in order to prevent the medium from being heated in the portion, of the scatterer, in contact with the slider floating surface, a distance from the end of the portion in contact with the slider floating surface to the center of the scatterer is preferably set to be larger than ½ of a mode field diameter of a waveguide (i.e., a spot diameter of incident light).

When the upper part of the scatterer is increased in width, a protrusion may be formed in the upper part of the scatterer. Accordingly, the volume of the scatterer can be increased, and thus radiation properties are improved, leading to further reduction in temperature rise of the scatterer. In this case, in order to reduce propagation loss of the waveguide, a distance from the center of the core of the waveguide to the projecting portion of the upper part of the scatterer is preferably set to be $1.5\times\frac{1}{2}=0.75$ or more times the mode field diameter of the waveguide.

When the upper part of the scatterer is increased in width, the thickness of both ends of the scatterer (i.e., a width in a direction parallel to the polarization direction of the incident light) may be partially increased. In this case, a distance from the portion increased in width to the center of the scatterer is preferably set within a range between $(0.413\lambda-127)$ $\{-0.39\times(n-1.63)+1\}$ and $(0.388\lambda+122)$ $\{-0.39\times(n-1.63)+1\}$ (the unit is nm). When the distance is set within the above range, light emitted from the exit of the waveguide hits against the portion increased in width and is reflected by the side of the portion increased in width. The light reflected by the surface of one of the portions increased in width on both sides of the scatterer and the light reflected by the surface of the other portion interfere with each other, thereby increasing the intensity in the center portion. The scatterer serves not only to propagate plasmons but also as an antenna which collects light energy and converts the energy into charge oscillation in the scatterer. Therefore, when the intensity of the incident light is increased in the center portion of the scatterer, the energy is more efficiently collected in the scatterer, thereby making it possible to increase the optical near-field intensity. Note that the width of the portion increased in width is preferably set to 250 nm or more, in order to increase the optical near-field intensity.

The present invention improves radiation properties of a thermally assisted magnetic recording head using a conductive scatterer as an optical near-field generator. The present invention can also enhance the efficiency in generation of optical near-field, and thus can reduce the necessary incident light power as well as the amount of heat generated in the scatterer. As a result, the present invention can suppress temperature rise of the scatterer.

DESCRIPTION OF THE PREFERRED EMBODIMENTS

Description will be given below with regard to embodiments of the present invention with reference to the accompanying drawings.

Figure 1:
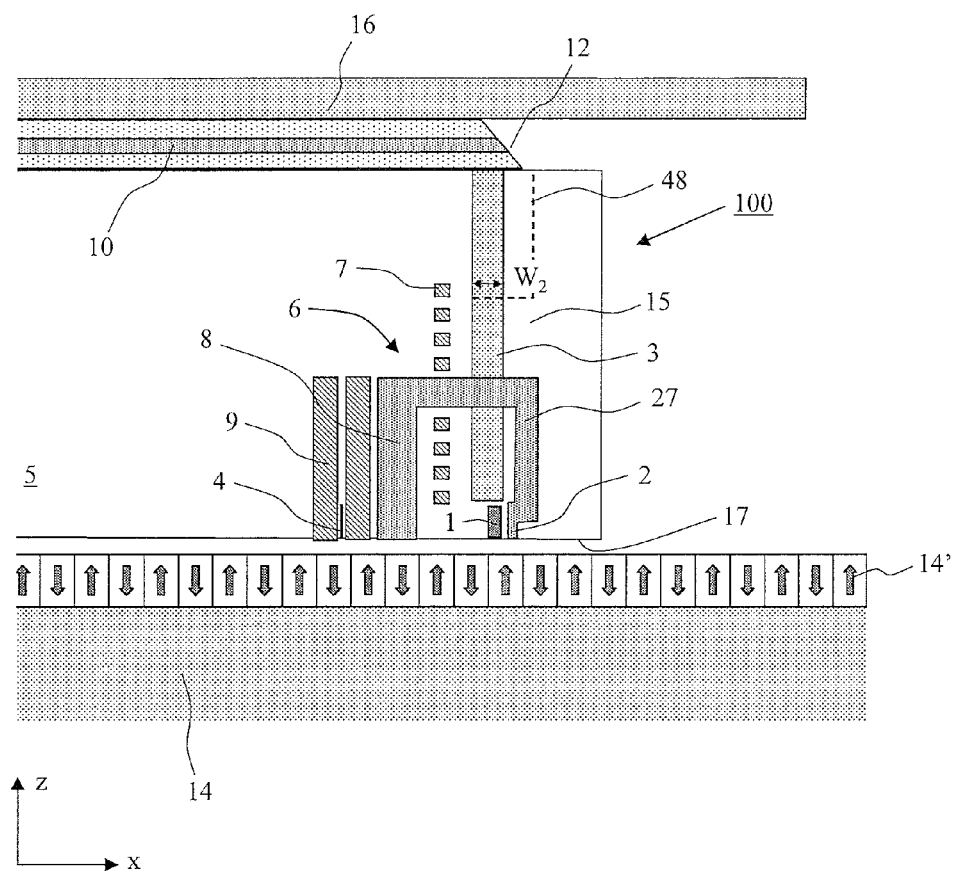
FIG. 1 is a cross-sectional side view showing a thermally assisted magnetic recording head of the present invention.

FIG. 1 shows a configuration example of a thermally assisted magnetic head 100 according to the present invention.

Figure 39:
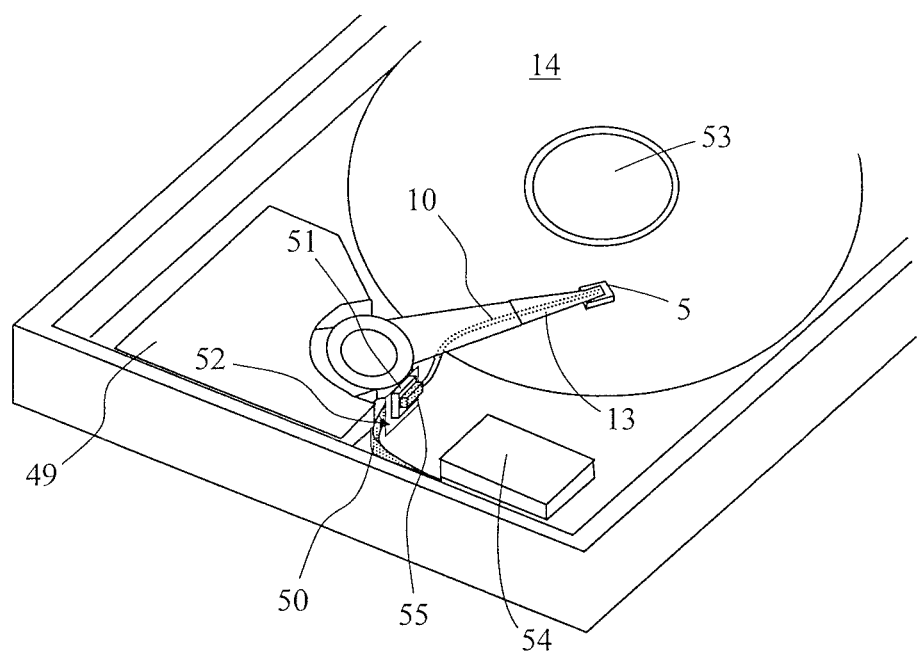
FIG. 39 is a view showing a configuration example of a recording/reproducing device.

A semiconductor laser having a wavelength of 780 to 980 nm is used as a light source, and is installed near the base of a suspension (see reference numeral 55 in FIG. 39). A polymer waveguide 10 is used to transmit light from the light source to a slider 5. The polymer waveguide 10 is disposed on a flexure 16 of the suspension. A 45-degree mirror 12 is formed on an end face of the polymer waveguide 10 so that light emitted from the polymer waveguide 10 is emitted in a direction perpendicular to the upper surface of the slider 5. Although the polymer waveguide 10 is used as a waveguide for transmitting light from the light source to the slider 5 in this embodiment, any other waveguide, such as a quartz fiber or a plastic fiber, may be used.

In the floating slider 5, a recording waveguide 3 (a core part thereof is illustrated in FIG. 1) is formed for guiding light from an opposite side of a slider floating surface (medium facing surface) 17 to the slider floating surface 17. Materials of the core 3 and a clad part 15 of the recording waveguide are $Ta_2O_5$ and $Al_2O_3$, respectively. When the wavelength is 780 nm, a core width in a direction perpendicular to a recording track direction is 600 nm, and a core width $W_2$ in a direction parallel to the recording track direction is 300 nm. Meanwhile, when the wavelength is 980 nm, the core width in the direction perpendicular to the recording track direction is 700 nm, and the core width $W_2$ in the direction parallel to the recording track direction is 350 nm. For the material of the waveguide 3, for example, the material of the clad may be $Al_2O_3$ and the material of the core may be $TiO_2$, as long as the refractive index of the core is larger than the refractive index of the clad. Alternatively, the material of the clad may be $SiO_2$ and the material of the core may be $Ta_2O_5$, $TiO_2$, $SiO_xN_y$, or $SiO_2$ doped with Ge. Below the waveguide 3 (i.e., at the exit end), an optical near-field generator 1 is formed to generate a light spot having a diameter of several 10 nm or less.

Figure 5:
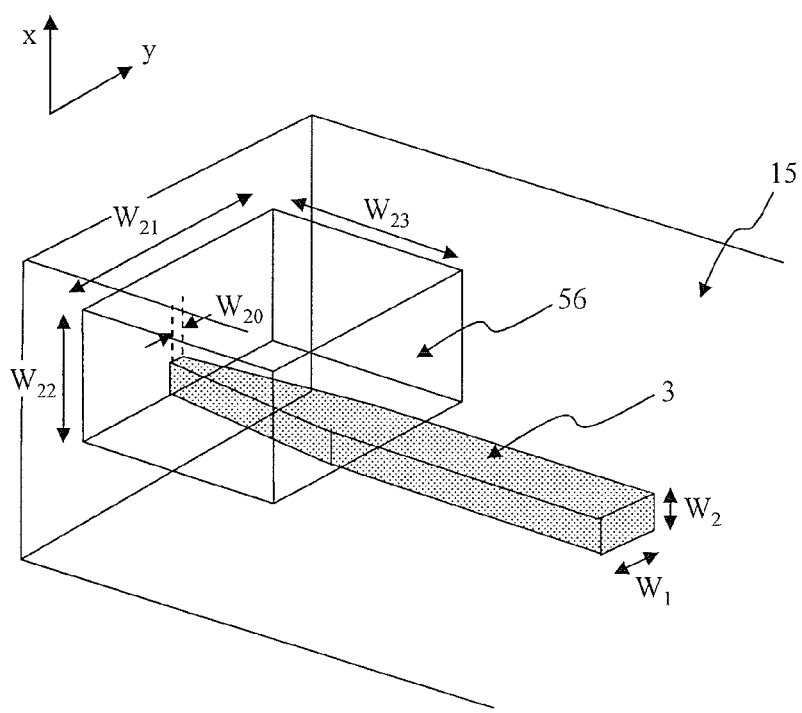
FIG. 5 is a view showing a mode field diameter converter of a waveguide.

A spot diameter converter 48 as shown in FIG. 5 is formed at the entrance of the waveguide 3 to efficiently couple light emitted from the semiconductor laser to the waveguide 3. A width $W_{20}$ of the waveguide 3 at its entrance side is set smaller than a width $W_1$ thereof at its exit side, and a layer 56 is formed around the core of $Ta_2O_5$, the layer being made of a material having a refractive index intermediate between the refractive indices of the core of the waveguide 3 and the clad 15. Use of this structure can increase a mode field diameter in an incident part of the waveguide. As a result, efficiency of coupling of the light emitted from the semiconductor laser to the waveguide can be enhanced. In this embodiment, the material of the layer 56 is $SiO_xN_y$, and a ratio of O to N in $SiO_xN_y$ is adjusted so that the refractive index of $SiO_xN_y$ is larger by 0.05 than that of $Al_2O_3$. The width $W_{20}$ on the incident side of the waveguide core is 80 nm. A width $W_{21}$ of the layer 56 is 10 μm, a height $W_{22}$ thereof is 5 μm, and a length $W_{23}$ thereof is 150 μm.

A recording magnetic field is generated by a magnetic head part 6 including a coil 7, a thick pole 27 for transmitting a magnetic flux generated by the coil, a main pole 2, and a return pole 8. The magnetic field generated by the coil 7 is transmitted through the thick pole 27 for transmitting the magnetic flux generated by the coil, and then guided to the vicinity of the optical near-field generator 1 by the main pole 2. At the instant of recording, a recording mark is written into a recording layer 14' by heating a recording medium 14 with light generated by the optical near-field generator 1 and, at the same time, applying the recording magnetic field generated from the main pole 2 to the recording medium 14. A distance $W_{13}$ between the edge of the waveguide core 3 and the edge of the main pole 2 (see FIG. 3) in the x direction is 70 nm.

On the side of a write head, as shown in FIG. 1, a reproducing head including a magnetic reproducing element 4 is formed. In this embodiment, a giant magneto resistive (GMR) element or a tunneling magneto resistive (TMR) element is used as the magnetic reproducing element 4. A magnetic shield 9 for preventing leakage of the magnetic field is formed around the magnetic reproducing element 4.

Figure 2:
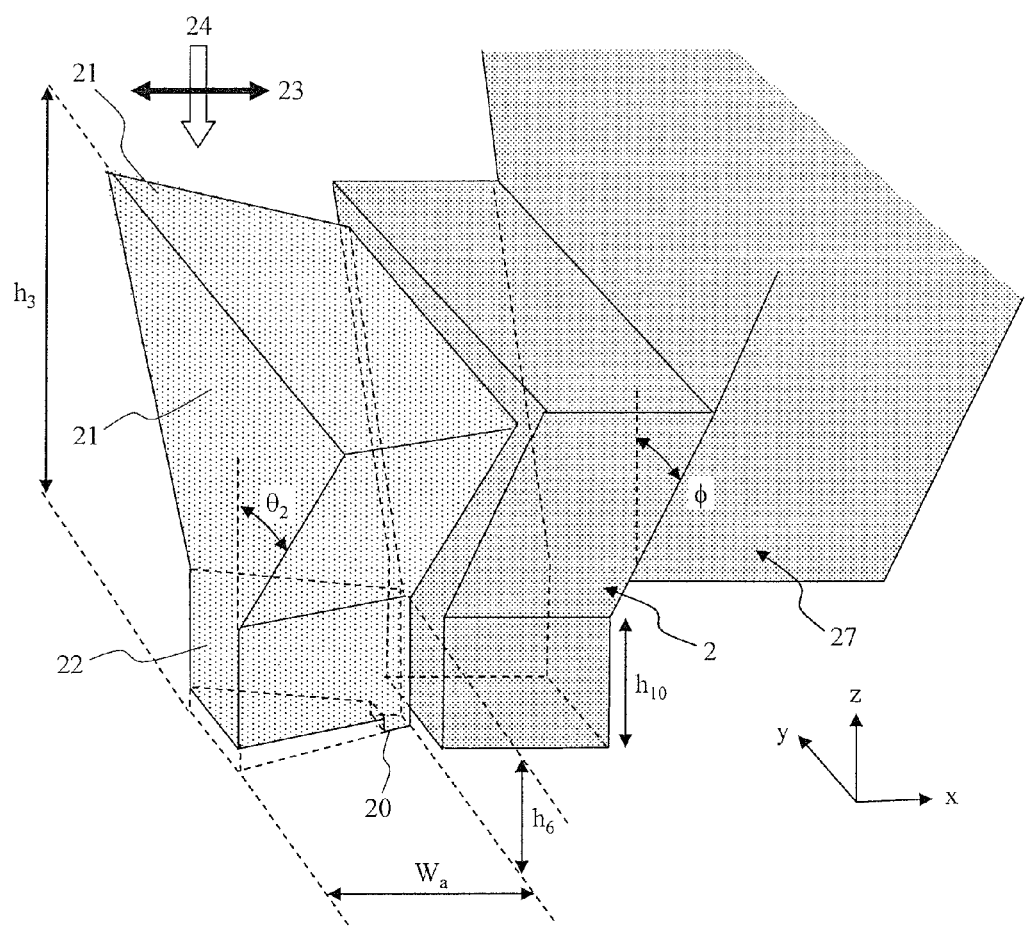
FIG. 2 is a view showing a tip of a main pole and a part of an optical near-field generator.
Figure 3:
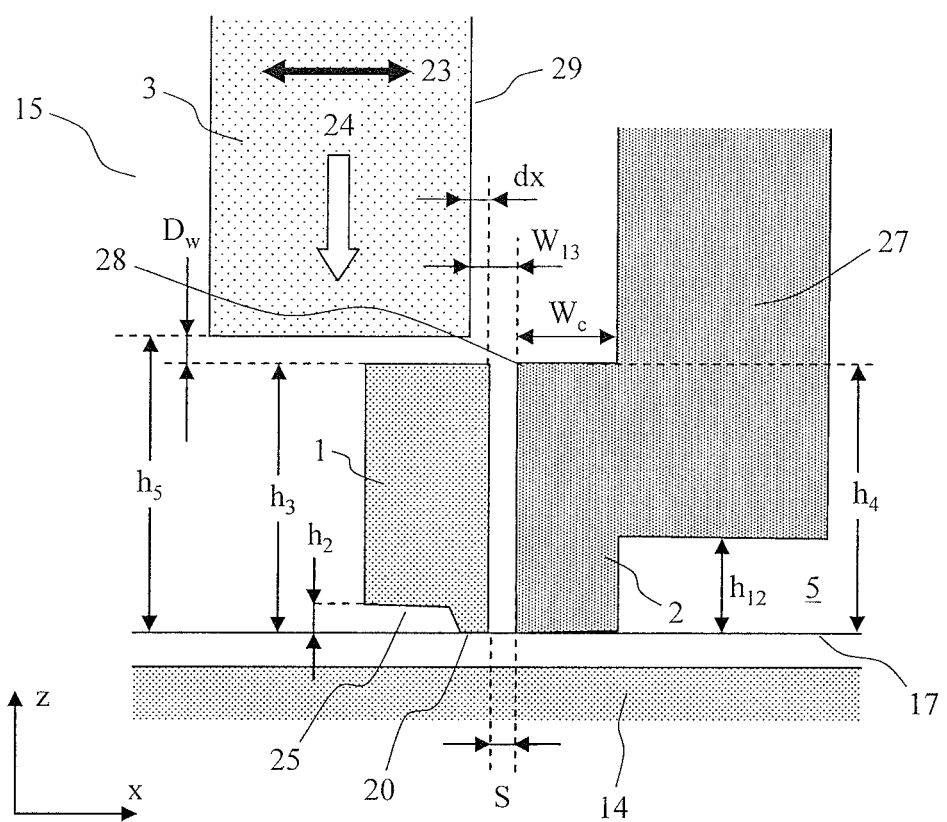
FIG. 3 is a cross-sectional side view showing the tip of the main pole and a part of the optical near-field generator.

FIG. 2 is an enlarged view of the main pole 2 and the optical near-field generator 1. FIG. 3 is a cross-sectional view of the part shown in FIG. 2 when sectioned in the direction parallel to the x-z plane, and FIG. 4 is a view thereof from the floating surface side.

As the pole, the main pole 2 is formed at the tip of the thick pole 27 for transmitting the magnetic flux generated by the coil. The tip of the main pole 2 is reduced in width, widths ($W_c$ and $W_d$) of the tip of the main pole in the x and y directions are $W_c$=150 nm and $W_d$=100 nm, and a height of the narrowed portion (i.e., a throat height) $h_{10}$ is 50 nm. A portion above the narrowed portion is gradually increased in width, and an angle φ of the tapered portion is 45 degrees. A height $h_4$ of the main pole is 500 nm. A distance $h_{12}$ between the thick pole 27 and the slider floating surface 17 is 100 nm. The material of the pole is NiFe or CoFe alloy. Use of this structure can focus the magnetic field generated by the coil on a narrow region, thus allowing a strong magnetic field of 8 kOe or more to be generated at a light heating position.

Figure 4:
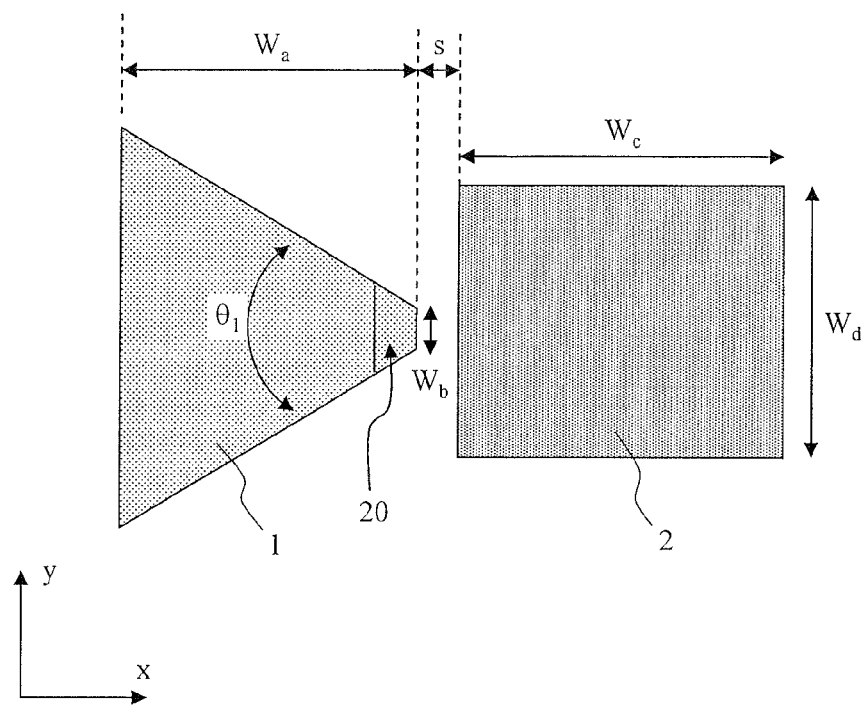
FIG. 4 is a cross-sectional view from the floating surface side, showing the tip of the main pole and a part of the optical near-field generator.

As shown in FIG. 4, the optical near-field generator has a shape (a triangular shape in this embodiment) which is, when viewed from the slider floating surface, gradually reduced in width toward the apex where optical near-field is generated. Moreover, as shown in FIG. 2, the optical near-field generator has a shape which is, when viewed from the side of the slider, obtained by connecting a triangular prism-shaped lower part 22 of a scatterer to the bottom of a tapered part 21 in which the width of the scatterer is gradually reduced toward the bottom surface of the scatterer (i.e., the surface on the slider floating surface side). The side shape of the scatterer is, in other words, a shape which is obtained by connecting the triangular prism-shaped lower part 22 of the scatterer to the bottom of the tapered part 21 in which the width of the scatterer is gradually reduced toward a traveling direction of incident light. The traveling direction of incident light is set to be a direction (direction of arrow 24) substantially perpendicular to the bottom surface of the scatterer, and a polarization direction is set to be a direction of arrow 23 (x direction) in FIG. 2. When this light is made incident on the scatterer, charges in the scatterer oscillate in a direction parallel to the polarization direction of the incident light. The charge oscillation has a resonance frequency, which is dependent on a width Wa of the scatterer in the direction parallel to the polarization direction. When the width Wa of the scatterer is adjusted so that the resonance frequency of charge oscillation coincides with the light frequency, a charge oscillation resonance (surface plasmon) is generated, and incident light energy is efficiently converted into charge oscillation energy. The surface Plasmon generated in the upper part of the scatterer travels in a direction parallel to the traveling direction of the light and reaches the bottom surface of the scatterer. At the bottom surface of the scatterer, the shape of the scatterer is such that its width is gradually reduced toward the apex 20. Accordingly, the charges in the scatterer are focused on the apex 20. As a result, a localized electromagnetic field, that is, optical near-field is generated at the apex 20. Particularly when the recording medium 14 is present near the optical near-field generator 1, interaction between the charges in the scatterer and image charges in the medium draws the charges further to the center, thus generating strong optical near-field at the apex 20 near the medium.

Figure 6:
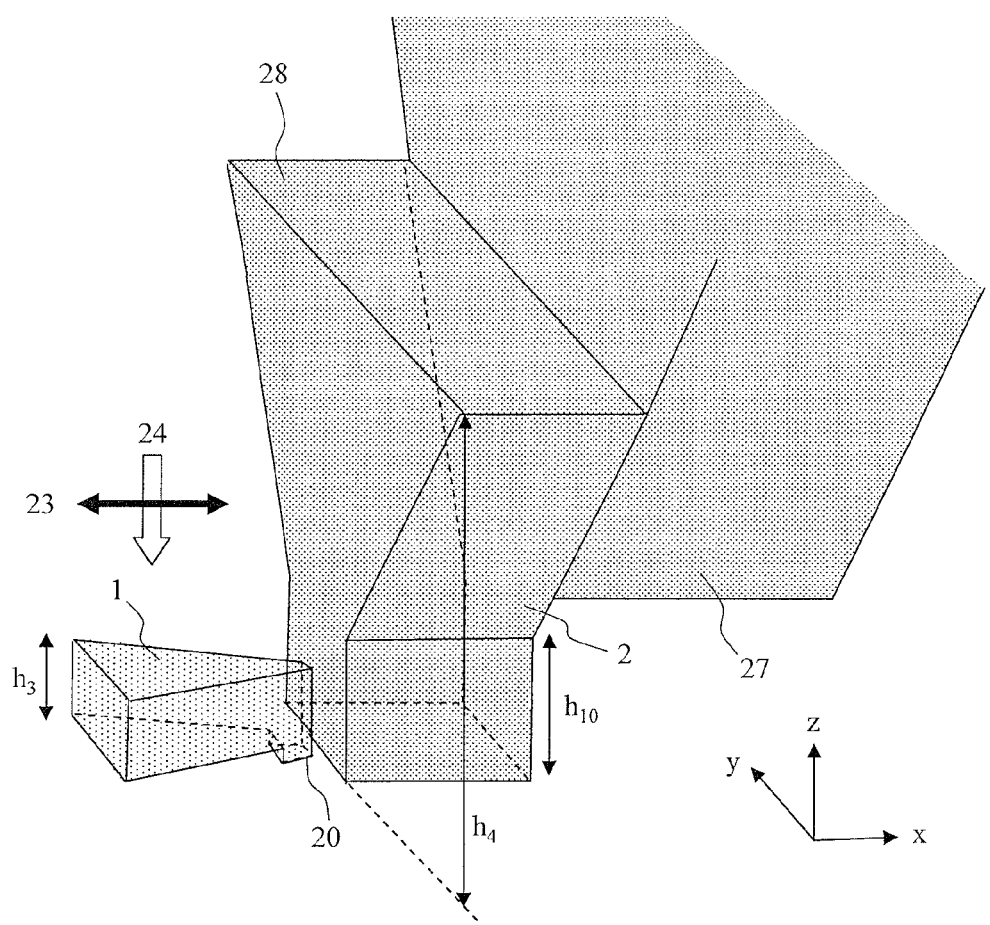
FIG. 6 is a view showing a conventional example.

In a conventional structure, as shown in FIG. 6, the scatterer has a shape fixed in the traveling direction of light. For example, the shape of the scatterer is a triangular prism when the shape of the scatterer viewed from the floating surface side is a triangle. On the other hand, in the structure of the present invention, the scatterer has a shape such that its width is gradually reduced toward the bottom surface of the scatterer. Such a shape of the scatterer allows plasmons generated in the wide portion of the upper part of the scatterer to be focused on the bottom of the scatterer. As a result, the efficiency in generation of optical near-field generated at the apex 20 can be enhanced. Thus, necessary light intensity as well as the amount of heat generated in the scatterer can be reduced. Further, the portion increased in width in the upper part of the scatterer increases the volume of the scatterer, thereby improving radiation properties. For these reasons, the internal temperature of the scatterer can be reduced.

In this embodiment, gold is used as a material of the scatterer, and alumina ($Al_2O_3$) is used as a material of the periphery of the scatterer. A semiconductor laser having a wavelength of 630 to 1550 nm is used for the incident light. The width Wa of the scatterer 1 in the x direction (see FIGS. 2 and 4) is adjusted according to the wavelength so that plasmon resonance is generated. For example, the width Wa is 80 nm when the wavelength is 780 nm, and the width Wa is 100 nm when the wavelength is 980 nm. The material of the scatterer may be, for example, silver, copper, aluminum, platinum or the like as long as it is conductive. Moreover, a light source other than the semiconductor laser, such as a He—Ne laser, may be used as the light source, and the wavelength may be outside the above range between 630 and 1550 nm. The spot diameter of the optical near-field is approximately equal to a width Wb (see FIG. 4) of the apex 20 where the optical near-field is generated, and the width Wb needs to be set smaller than the recording track width. The required width Wb is dependent on a recording density and a bit aspect ratio (a ratio of widths in a down-track direction and in a cross-track direction) of recording bits. In this embodiment, the width Wb is set to 10 to 30 nm for the recording density of 1 to 2.5 $Tb/in^2$. An apex angle $\theta_1$ of the scatterer when viewed from the floating surface side is 40 to 60 degrees, and a distance between the main pole 2 and the apex 20 where the optical near-field is generated is 20 nm.

A portion 25 other than the apex 20 on the surface of the scatterer facing the medium (see FIG. 3) is configured so that a distance between the surface 25 of the scatterer and the medium surface is larger than that between the apex 20 of the scatterer and the medium surface. When the light is made incident on the scatterer, a weak optical near-field (background light) is generated not only at the apex 20 but also on the side opposite to the apex 20. When the background light hits against the medium, the medium is heated in other portions than the apex 20, and recorded information in those portions may be erased. When the surface 25 on the medium side is shaved so as to increase the distance between the surface 25 of the scatterer and the medium surface as described above, a weak optical near-field generated on the side opposite to the apex 20 no longer reaches the medium surface. Thus, the influence of the optical near-field on the medium can be reduced. In this embodiment, a recess amount $h_2$ in the surface 25 is set to 10 nm.

Figure 7:
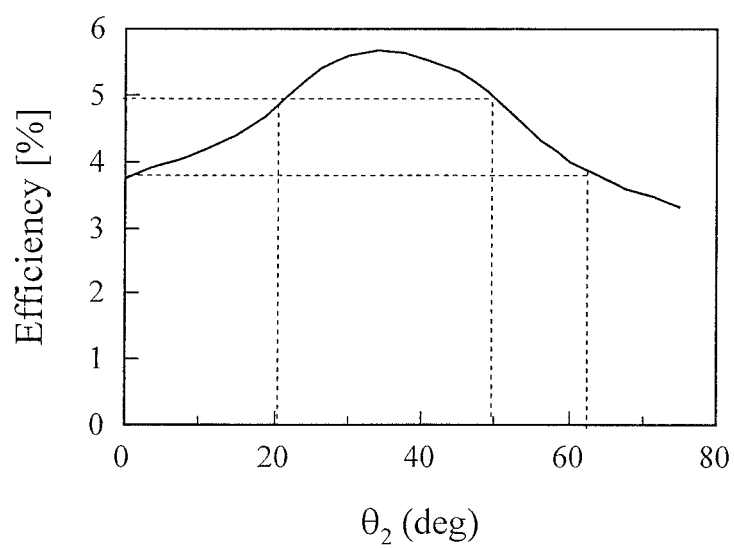
FIG. 7 is a graph showing a relationship between a taper angle and optical near-field generation efficiency.

FIG. 7 shows a relationship between light use efficiency and a spread angle $\theta_2$ of the tapered portion 21 in the upper part of the scatterer. Here, a height $h_3$ of the scatterer is 400 nm. In the lower part 22 of the scatterer the width in the y direction, when viewed in the height direction, is fixed, and a tapered portion is formed in a portion where the height from the floating surface is 150 nm or more (i.e., a portion where $h_6$ reaches 150 nm or more in FIG. 2). The wavelength of the incident light is 780 nm. The light use efficiency is expressed by a ratio of power of light incident on the scatterer to an amount of heat absorbed by the recording medium near the apex 20 where the optical near-field is generated. As the recording medium, a medium including a recording layer made of FePt is used. As shown in FIG. 7, when the spread angle $\theta_2$ is 65 degrees or less, the light use efficiency is increased when the upper part of the scatterer is increased in width, compared with the case where the upper part of the scatterer is not increased in width ($\theta_2=0$). For a higher recording density, particles making up the recording medium need to be reduced in diameter so that a signal-to-noise ratio of reproduced signal is maintained at an appropriate value. When the particle diameter is reduced, coercivity of the medium needs to be increased to suppress the influence of thermal fluctuations. Generally, the larger the coercivity of the medium, the higher the Curie temperature. Thus, a heating temperature for the medium needs to be increased. To achieve a recording density of 1.5 $Tb/in^2$ or higher, the medium temperature needs to be set to about 250° C. or more, and the light use efficiency of 5% or more is required. As shown in FIG. 7, the light use efficiency of 5% or more can be achieved by setting the spread angle $\theta_2$ between 20 degrees and 50 degrees.

Note that the reason of providing the tapered portion in the portion where the height $h_6$ reaches 150 nm or more and of fixing the width in the y direction in the portion therebelow in the embodiment is to reduce the influence of machining error. Specifically, the height $h_3$ of the scatterer may vary due to an error in lapping amount during machining In this regard, the width Wb of the tip 20 of the scatterer when viewed from the slider floating surface (see FIG. 4) is changed unless the portion with the fixed width is provided. As a result, the spot diameter of the optical near-field generated is changed. To prevent this, the portion with the fixed width in the y direction is provided in the lower part 22 of the scatterer. The height $h_6$ of the portion with the fixed width in the y direction may be set smaller than 150 nm, e.g., to 50 nm or 100 nm, if the machining error is small.

Figure 8A:
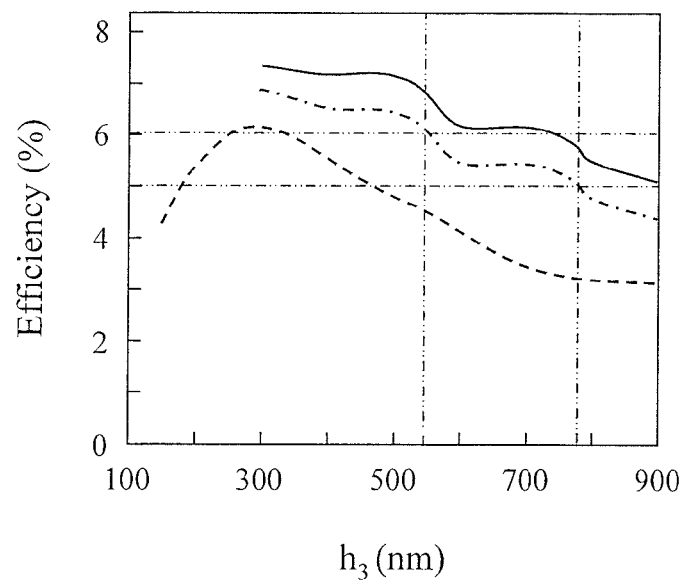
FIGS. 8A and 8B are graphs each showing a relationship between a height of a scatterer and optical near-field intensity, FIG. 8A showing the relationship for each wavelength, and FIG. 8B showing a case where a material around the scatterer is changed.

The dotted line in FIG. 8A shows a relationship between the height $h_3$ of the scatterer and the light use efficiency when the spread angle $\theta_2$ is set to 40 degrees. As shown in FIG. 8A, the light use efficiency is at its maximum when the height $h_3$ of the scatterer is 300 nm, and is gradually reduced as the height gets larger than 300 nm. To realize light use efficiency of 5% or more, which is required to achieve a recording density of 1.5 $Tb/in^2$ or higher, the height $h_3$ of the scatterer is preferably set within a range between 150 nm and 450 nm. Note that the reason why the optical near-field intensity is high when the height $h_3$ of the scatterer is 300 nm is considered to be because of interference of plasmon waves transmitted inside the scatterer. In other words, plasmon waves transmitted toward the lower part within the scatterer are reflected by the bottom surface of the scatterer, and as a result, plasmon waves traveling in the same direction as that of the incident light interfere with those traveling in the opposite direction inside the scatterer. When the height $h_3$ of the scatterer is 300 nm, the interference is considered to occur so that the light intensity is increased at the apex 20 where the optical near-field is generated.

Figure 9:
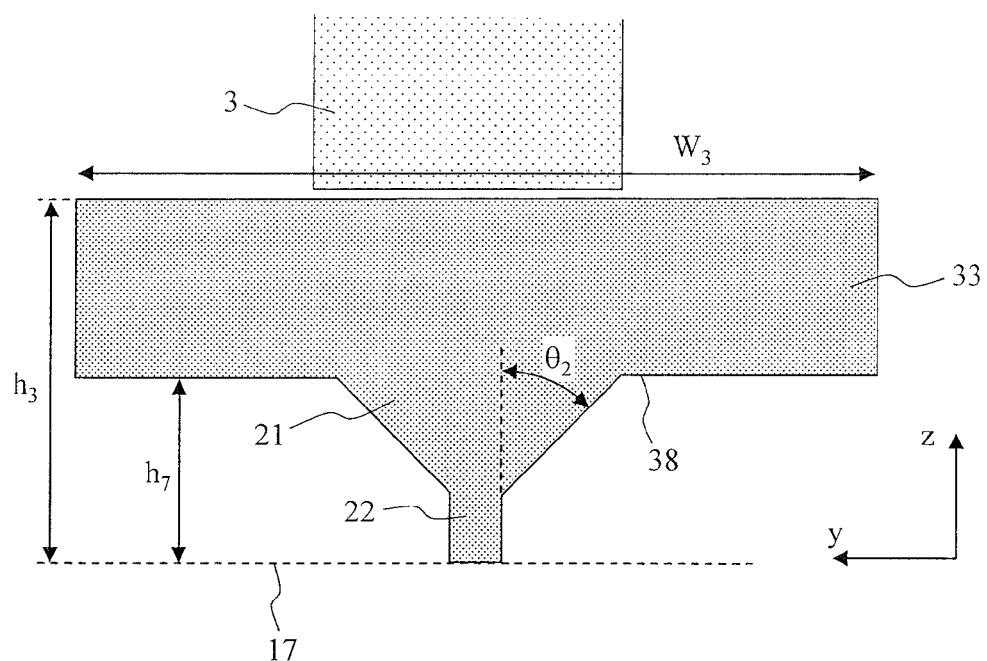
FIG. 9 is a view showing a case where an upper part of the scatterer is significantly increased in width.

As shown in FIG. 9, the upper part of the scatterer may be further increased in width. In this example, a rectangular scatterer 33 is disposed on the tapered portion 21 of the scatterer. This increase in width of the upper part of the scatterer allows the light emitted from the waveguide 3 to be collected over a wider range, thus making it possible to further increase the optical near-field intensity. In other words, plasmons are excited over a wide range in the upper part of the scatterer, and are focused in the center, thereby increasing the optical near-field intensity. Thus, required incident light intensity can be reduced. Further, the volume of the scatterer can be increased, and thus radiation properties are improved. For these reasons, temperature rise of the optical near-field generating unit can be suppressed.

Figure 10A:
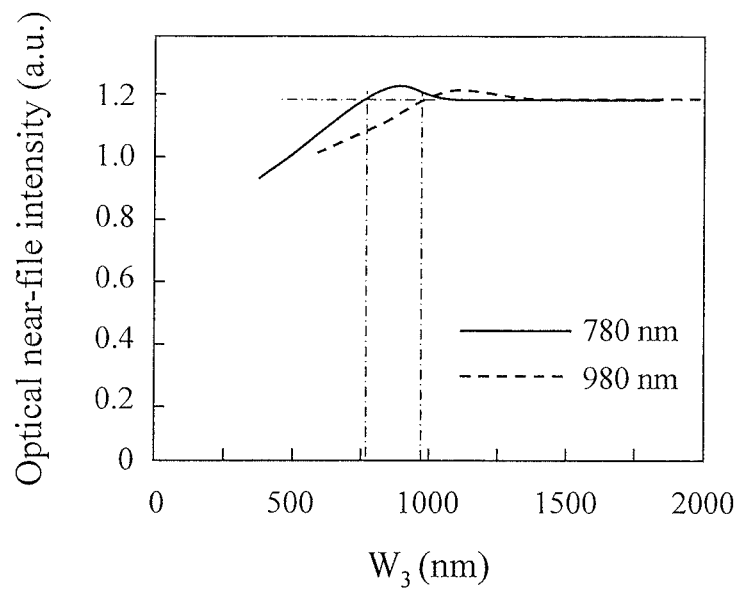
FIGS. 10A and 10B are graphs each showing a relationship between the width of the upper part of the scatterer and optical near-field intensity, FIG. 10A showing width dependency of the upper part of the scatterer, and FIG. 10B showing a relationship between an optimum range and a wavelength of incident light.
Figure 10B:
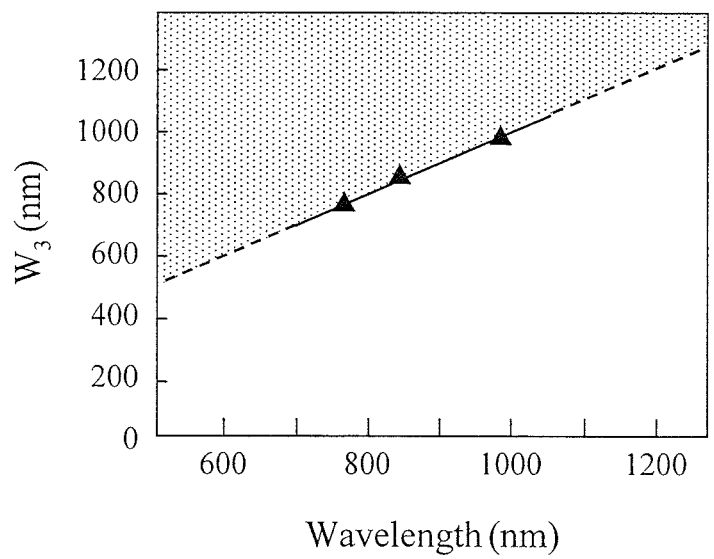

FIG. 10A shows a relationship between the width $W_3$, of the portion 33 increased in width, in the y direction and the intensity of optical near-field generated near the apex 20. The solid line shows the case where the incident light wavelength is 780 nm, and the dotted line shows the case where the incident light wavelength is 980 nm. A distance $h_7$ from the slider floating surface to the portion increased in width is 250 nm when the wavelength is 780 nm, and is 300 nm when the wavelength is 980 nm. FIG. 10A shows that the larger the width $W_3$, the higher the optical near-field intensity, and that the optical near-field intensity approaches a constant value when the width exceeds a certain value. The width $W_3$ is preferably set to be equal to or larger than this threshold value, in order to generate a strong optical near-field. FIG. 10B shows a relationship between the width (threshold value) and the wavelength when the intensity reaches the constant value. Each of the triangular points indicates a minimum value of an optimum width for each wavelength, and the shaded region indicates a region where the optimum width is obtained. FIG. 10B shows that the minimum value of the optimum width becomes approximately equal to the wavelength of the incident light. In other words, the width $W_3$ is preferably set to be equal to or larger than the incident light wavelength. Note that the width $W_3$ is preferably large in view of radiation properties if it is equal to or larger than the wavelength.

The dashed line in FIG. 8A shows a relationship between light use efficiency and the height h3 of the scatterer when the width of the upper part of the scatterer is increased to be larger than the wavelength. Here, the wavelength of the incident light is set to 780 nm, and the width $W_3$ of the upper part of the scatterer is set to 3 µm. FIG. 8A shows that increasing the width of the upper part of the scatterer makes it possible to increase the optical near-field intensity and also to increase the maximum value of the range of the height $h_3$ of the scatterer, which can realize the same light use efficiency. For example, when the upper part of the scatterer is not increased in width, the height of the scatterer needs to be set to 450 nm or less to achieve the light use efficiency of 5% or more, which is required to achieve a recording density of 1.5 Tb/in$^2$ or higher. However, by increasing the upper part of the scatterer in width as shown in FIG. 9, an allowable maximum value of the height $h_3$ of the scatterer can be increased close to 780 nm. This increase in the height of the scatterer allows the volume of the scatterer to be increased, thus enabling improvement of radiation properties. As a result, temperature rise of the optical near-field generator can be suppressed.

The dashed line in FIG. 8A shows that, when the upper part of the scatterer is increased in width, the light use efficiency is gradually reduced as the height $h_3$ of the scatterer is increased. This is considered to be because of interference of plasmon waves inside the scatterer. To be more specific, plasmon waves transmitted inside the scatterer are reflected by a lower part 38 of the portion 33, of the scatterer, which is increased in width, and by the lower surface 25 of the scatterer, and then interferes with plasmons traveling in the traveling direction of the incident light. In this event, as with a Fabry-Perot resonator, the intensity at the apex 20 where the optical near-field is generated is dependent on the height $h_3$ of the scatterer, which corresponds to the length of the resonator.

Figure 11:
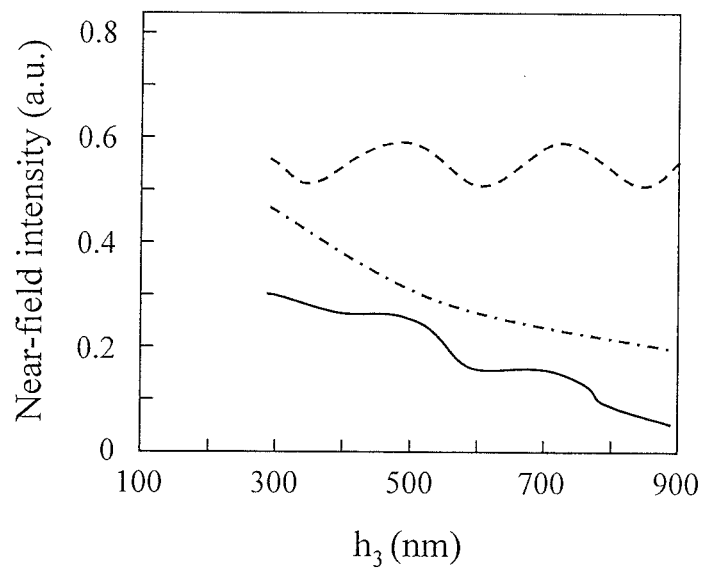
FIG. 11 is a graph explaining the principle of the relationship between the height of the scatterer and the optical near-field intensity.

When there is no internal loss, the intensity changes periodically, as indicated by the dotted line in FIG. 11, relative to the height $h_3$ of the scatterer. Since there is, in fact, a propagation loss in the scatterer, the actual intensity is obtained by being multiplied by an exponential function as indicated by the dashed line. As indicated by the solid line in FIG. 11, the intensity changes gradually relative to the height $h_3$ of the scatterer. A first inflection point is located near $h_3$=550 nm, and a second inflection point is located near $h_3$=780 nm. To achieve the light use efficiency of 5% or more, which is required to achieve a recording density of 1.5 Tb/in$^2$ or higher, the height $h_3$ of the scatterer needs only be equal to or less than the length (780 nm) at the second inflection point. Moreover, to achieve a higher recording density, it is necessary to use a medium with higher coercivity, and thus to increase the heating temperature. To achieve a recording density of 2.5 Tb/in$^2$ or higher, a heating temperature of 300° C. or higher is required, and thus light use efficiency of 6% or more is required. When the height $h_3$ of the scatterer is set to be equal to or less than the length (550 nm) at the first inflection point, the light use efficiency of 6% or more can be achieved.

Figure 8B:
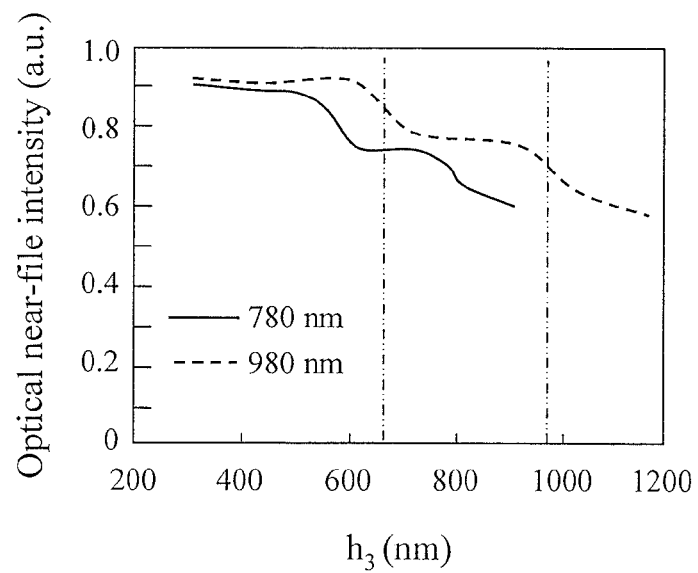
Figure 12:
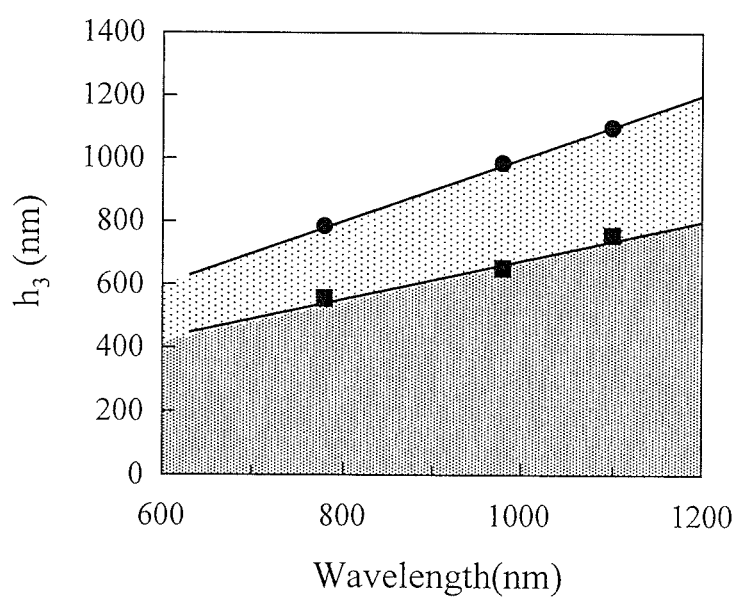
FIG. 12 is a graph showing a relationship between an optimum height range for the scatterer and the wavelength of incident light.

The relationship between the height $h_3$ of the scatterer and the optical near-field intensity is dependent on the incident light wavelength. The dotted line in FIG. 8B shows a relationship between the height $h_3$ of the scatterer and the optical near-field intensity when the incident light wavelength is set to 980 nm. As shown in FIG. 8B, as the wavelength gets longer, the positions of the inflection points move in a direction in which the height $h_3$ of the scatterer is increased. FIG. 12 shows a relationship between the incident light wavelength and the positions of the inflection points. Each of the square points indicates the height of the scatterer at the first inflection point, and each of the circular points indicates the height of the scatterer at the second inflection point. A relationship between the wavelength λ and the height $h_3$ of the scatterer at the first inflection point is approximately expressed as follows (the unit is nm).

$$h_3 = 0.612\lambda + 66 \quad (1)$$

When the height of the scatterer is equal to or smaller than the above value, the light use efficiency of 6% or more can be achieved. Meanwhile, a relationship between the wavelength λ, and the height $h_3$ of the scatterer at the second inflection point is approximately expressed as follows $$h_3 = \lambda \quad (2)$$

When the height of the scatterer is equal to or smaller than the above value, the light use efficiency of 5% or more can be achieved. Note that although the above relationships are obtained when the material of the periphery of the scatterer is $Al_2O_3$, approximately the same result is obtained even when a different material such as $SiO_2$ is used.

Figure 13A:
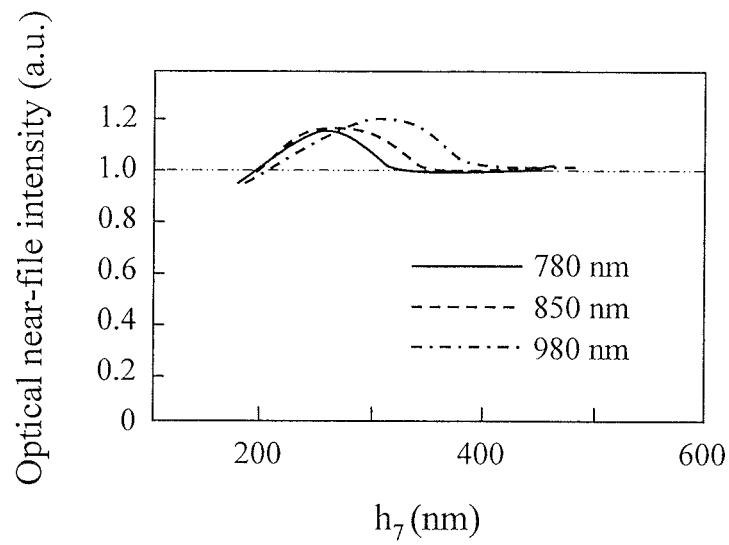
FIGS. 13A and 13B are graphs each showing a relationship between optical near-field intensity and a distance from the wide portion of the scatterer to the floating surface, FIG. 13A showing the relationship for each wavelength, and FIG. 13B showing a case where a material around the scatterer is changed.

FIG. 13A shows a relationship between optical near-field intensity and a distance $h_7$ from the slider floating surface to the portion increased in width. Here, the height $h_3$ of the scatterer is 500 nm, and the width $W_3$ of the upper part of the scatterer is 3 µm. The solid line indicates the case where the wavelength is 780 nm, the dotted line indicates the case where the wavelength is 850 nm, and the dashed line indicates the case where the wavelength is 980 nm. FIG. 13A shows that the optical near-field intensity is high when the distance $h_7$ is within a range of certain values. For example, in the case where the wavelength is 780 nm, the optical near-field intensity is approximately constant when the distance $h_7$ from the slider floating surface to the portion increased in width is 310 nm or more. Whereas, when the distance $h_7$ is within a range between 190 nm and 310 nm, the optical near-field intensity is higher than the value when the distance $h_7$ is 310 nm or more. The optimum range is dependent on the wavelength, and the longer the wavelength, the larger the optimum value.

Figure 14:
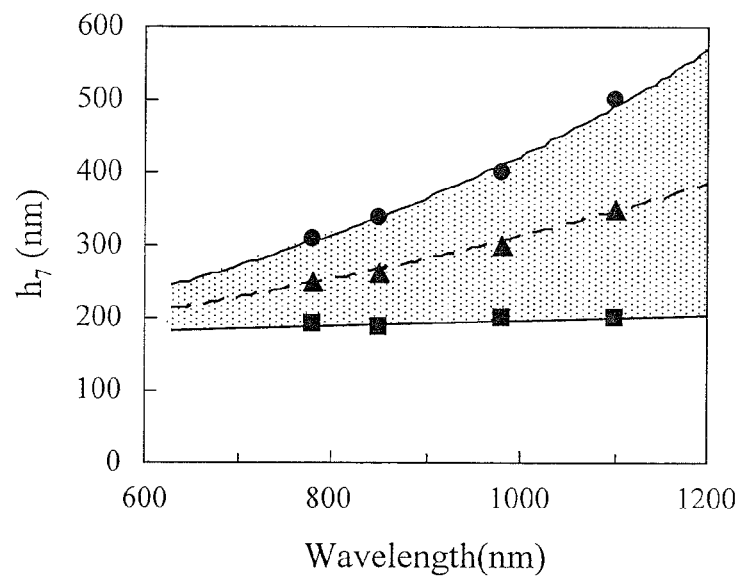
FIG. 14 is a graph showing a relationship between the incident light wavelength and an optimum value of the distance from the wide portion of the scatterer to the floating surface.

FIG. 14 shows a relationship between the wavelength and the optimum range of the distance $h_7$ from the slider floating surface to the portion increased in width. Each of the triangles indicates a distance when the optical near-field intensity is at its maximum, each of the circles indicates a maximum value in the optimum range, and each of the squares indicates a minimum value in the optimum range. When the incident light wavelength is $\lambda$, the optimum range is expressed as follows using an approximate equation (the unit is nm).

$$0.039\lambda + 157 \leq h_7 \leq 96.52 e^{0.0015\lambda} \tag{3}$$

Figure 13B:
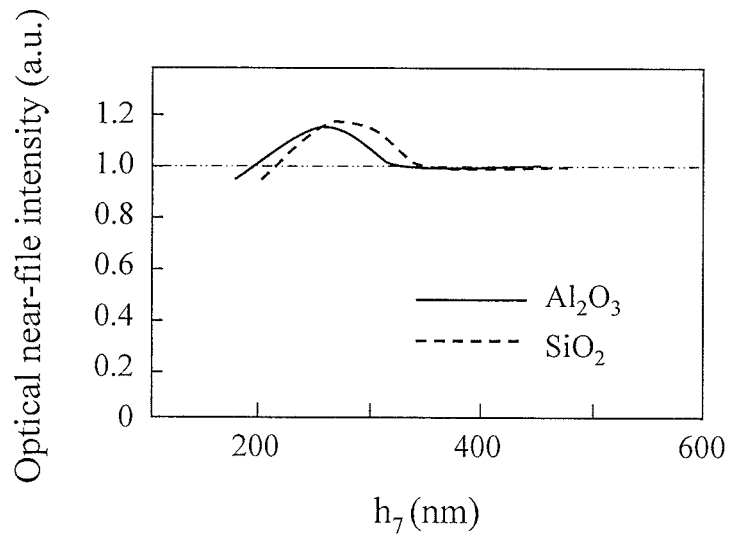

The optimum range of the distance $h_7$ from the slider floating surface to the portion increased in width is dependent on the refractive index of the material of the periphery of the scatterer. FIG. 13B shows a relationship between the distance $h_7$ and the optical near-field intensity when the wavelength is 780 nm and the material of the periphery of the scatterer is changed from $Al_2O_3$ (refractive index=1.63) to $SiO_2$ (refractive index=1.45). The solid line indicates the case of $Al_2O_3$, and the dotted line indicates the case of $SiO_2$. FIG. 13B shows that the smaller the refractive index of the material of the periphery, the larger the optimum value of the distance $h_7$. When the wavelength is 780 nm, the optimum value in the case of $SiO_2$ is 1.14 times greater than that in the case of $Al_2O_3$. A result of checking a difference in optimum value for the wavelengths other than 780 nm also shows that the optimum value in the case of $SiO_2$ is about 1.14 times greater than that in the case of $Al_2O_3$. Therefore, the optimum range in the case of $SiO_2$ is obtained by multiplying the above equation (3) by 1.14. When a material other than $Al_2O_3$ and $SiO_2$ is used for the periphery, it is only necessary to approximately multiply the equation (3) by the following equation (4).

$$\frac{1.14-1}{1.45-1.63} \times (n-1.63) + 1 = -0.778 \times (n-1.63) + 1 \tag{4}$$

That is, the optimum range is expressed as follows (the unit is nm).

$$(0.039\lambda+157)\{-0.778\times(n-1.63)+1\} \leq h_7 \leq 96.52\{-0.778\times(n-1.63)+1\}e^{0.0015\lambda} \tag{5}$$

Here, n represents the refractive index of the material of the periphery of the scatterer. Note that, although the optimum range of the distance $h_7$ from the slider floating surface to the portion increased in width is obtained when the height $h_3$ of the scatterer is 500 nm, the same optimum range is obtained when the height $h_3$ of the scatterer is set to any other value.

Figure 15:
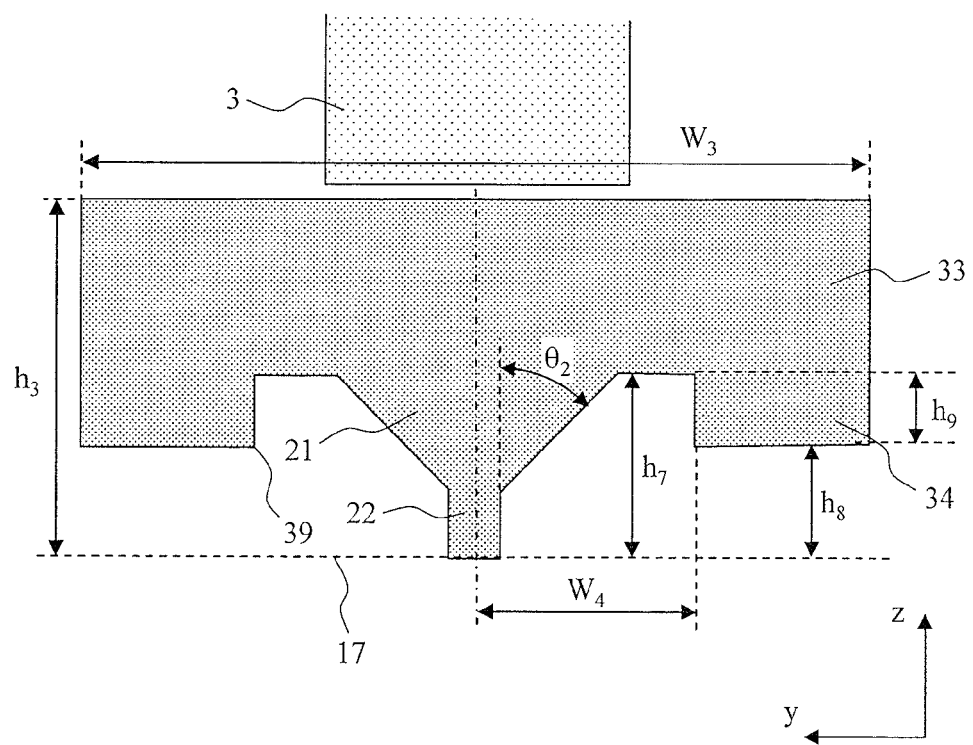
FIG. 15 is a view showing an optical near-field generator having a protrusion formed in a lower part of the wide portion of the scatterer.
Figure 16A:
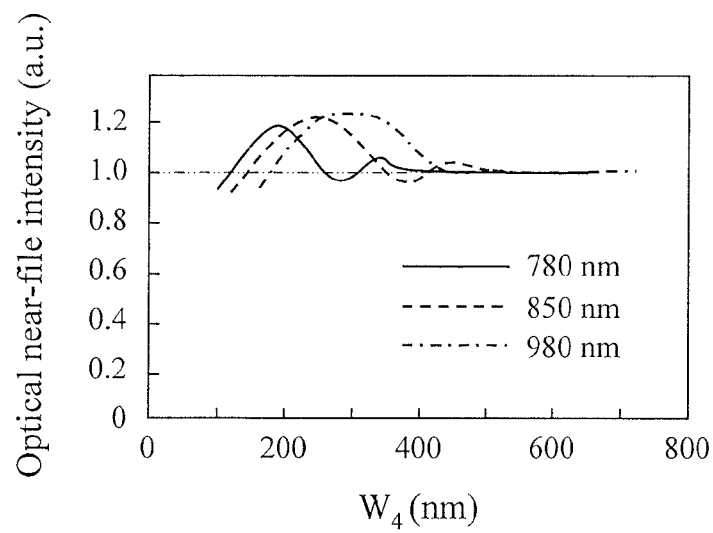
FIGS. 16A and 16B are graphs each showing a relationship between optical near-field intensity and a distance from the center of the scatterer to the protrusion formed in the lower part of the wide portion of the scatterer, FIG. 16A showing the relationship for each wavelength, and FIG. 16B showing a case where a material around the scatterer is changed.
Figure 17:
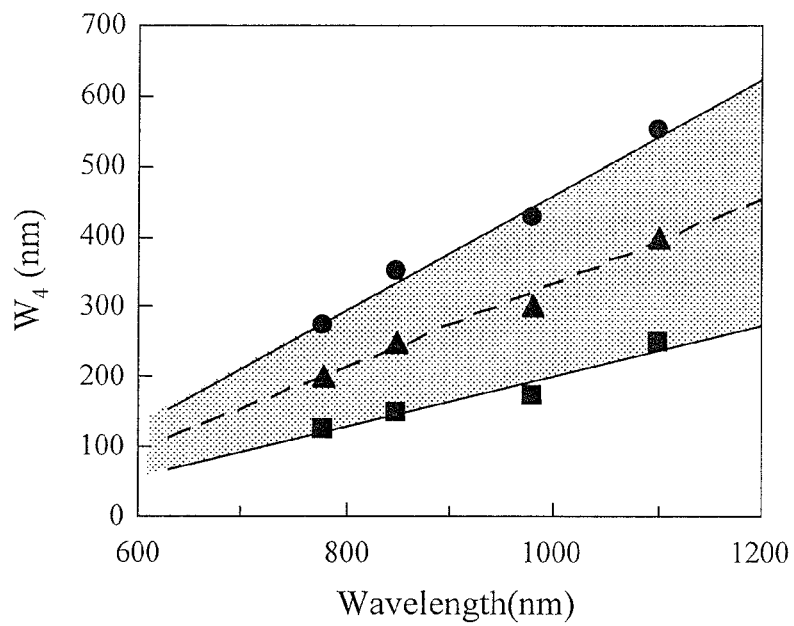
FIG. 17 is a graph showing a relationship between the wavelength and an optimum range of the distance from the center of the scatterer to the protrusion formed in the lower part of the wide portion of the scatterer.

When the width of the upper part of the scatterer is increased to be larger than the wavelength as described above, a protrusion 34 may be formed in the lower part of the portion 33 increased in width as shown in FIG. 15. By disposing such a protrusion at an optimum position, the intensity of the optical near-field generated at the apex 20 can be increased. FIG. 16A shows a relationship between the intensity of the optical near-field generated at the apex 20 and a distance $W_4$ from an edge 39 on the center side of the protrusion 34 to the center. Here, the spread angle $\theta_2$ of the tapered portion 21 is 45 degrees, the height $h_3$ of the scatterer is 500 nm, and the material of the periphery of the scatterer is $Al_2O_3$. The solid line, dotted line and dashed line show relationships when the incident light wavelength is 780 nm, 850 nm and 980 nm, respectively. The distance $h_7$ from the slider floating surface to the portion increased in width is 250 nm in the case of 780 nm, 260 nm in the case of 850 nm, and 300 nm in the case of 980 nm. These distances $h_7$ are optimum values that satisfy the equation (5). FIG. 16A shows that the optical near-field intensity is high when the distance $W_4$ from the edge 39 to the center is within a certain range. For example, in the case where the wavelength is 780 nm, the intensity of the optical near-field generated at the apex 20 approaches a constant value when the distance $W_4$ from the edge 39 to the center is sufficiently large. Whereas, when the distance $W_4$ from the edge 39 to the center is within a range between 190 nm and 310 nm, the optical near-field intensity higher than the constant value is obtained. FIG. 17 shows an optimum range of the distance $W_4$ from the edge 39 to the center for each incident light wavelength. Each of the triangles indicates a distance at which the optical near-field intensity is at its maximum, each of the circles indicates a maximum value in the optimum range, and each of the squares indicates a minimum value in the optimum range. When the incident light wavelength is $\lambda$, the optimum range is expressed as follows using an approximate expression (the unit is nm).

$$0.0369\lambda - 167 \leq W_4 \leq 0.821\lambda - 361 \tag{6}$$

Figure 16B:
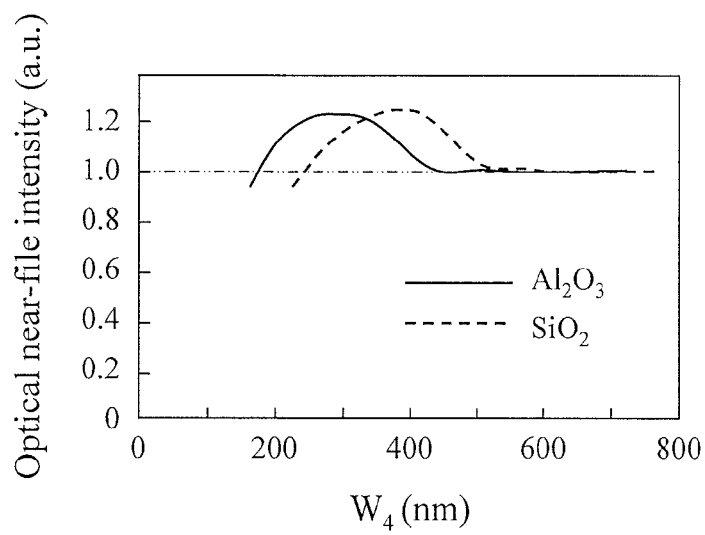

The optimum range of the distance $W_4$ from the edge 39 to the center of the scatterer is dependent on the refractive index of the material of the periphery of the scatterer. FIG. 16B shows a relationship between the distance $W_4$ from the edge 39 to the center and the optical near-field intensity when the wavelength is 980 nm and the material of the periphery of the scatterer is changed from $Al_2O_3$ (refractive index=1.63) to $SiO_2$ (refractive index=1.45). The solid line indicates the case of $Al_2O_3$, and the dotted line indicates the case of $SiO_2$. FIG. 16B shows that the smaller the refractive index of the material of the periphery, the larger the optimum value of the distance $W_4$. When the wavelength is 980 nm, the optimum value in the case of $SiO_2$ is 1.24 times greater than that in the case of $Al_2O_3$. A result of checking a difference in optimum value for the wavelengths other than 980 nm also shows that the optimum value in the case of $SiO_2$ is about 1.24 times greater than that in the case of $Al_2O_3$. Therefore, the optimum range in the case of $SiO_2$ is obtained by multiplying the above equation (6) by 1.24. When a material other than $Al_2O_3$ and $SiO_2$ is used for the periphery, it is only necessary to approximately multiply the equation (6) by the following equation (7).

$$\frac{1.24-1}{1.45-1.63} \times (n-1.63) + 1 = -1.33 \times (n-1.63) + 1 \tag{7}$$

That is, the optimum range is expressed as follows (the unit is nm).

$$(0.369\lambda-167)\{-1.33\times(n-1.63)+1\} \leq W_4 \leq (0.821\lambda-361)\{-1.33\times(n-1.63)+1\} \tag{8}$$

The solid line in FIG. 8A shows a relationship between the height $h_3$ of the scatterer and the optical near-field intensity when the protrusion 34 is formed in the lower part of the portion 33, of the scatterer, which is increased in width, as described above. Here, the wavelength is 780 nm, the distance $W_4$ from the edge 39 of the protrusion 34 to the center is 200 nm, and the distance $h_7$ from the slider floating surface to the portion increased in width is 250 nm. As shown in FIG. 8A, the optical near-field intensity is gradually reduced with the increase in the height $h_3$ of the scatterer, as in the case where the protrusion 34 is not provided. The absolute value of the optical near-field intensity is increased with the provision of the protrusion 34, whereas the distance $W_4$ to be an inflection point is almost the same as that without the provision of the protrusion 34. When the distance $W_4$ is equal to or smaller than a second inflection point ($W_4$=780 nm), that is, when the equation (2) is satisfied, light use efficiency of 6% or more which can achieve a recording density of 2.5 Tb/in$^2$ is obtained. To achieve a recording density of 4 Tb/in$^2$ or higher, it is necessary to heat the medium surface to 350° C. or higher, and to do that, light use efficiency of 7% or more is required. When the distance $W_4$ is equal to or smaller than a first inflection point, that is, when the equation (1) is satisfied, the light use efficiency of 7% or more which can achieve the recording density of 4 Tb/in$^2$ is obtained.

Figure 18:
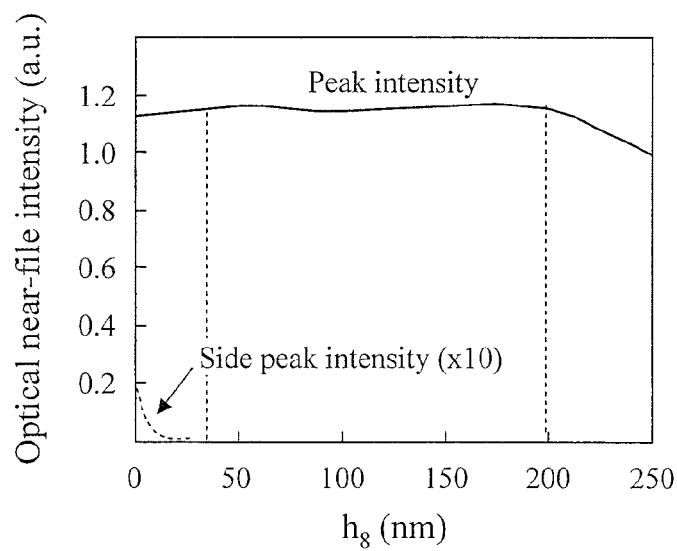
FIG. 18 is a graph showing a relationship between optical near-field intensity and a distance from the lower part of the protrusion formed in the lower part of the wide portion of the scatterer to the floating surface as well as a relationship between intensity of light generated near the protrusion and the distance from the lower part of the protrusion formed in the lower part of the wide portion of the scatterer to the floating surface.

FIG. 18 shows a relationship between a distance $h_8$ from the lower part of the protrusion to the slider floating surface and the intensity of the optical near-field generated at the apex 20 in the case where the protrusion 34 is formed in the lower part of the portion 33, of the scatterer, which is increased in width, as described above. Here, the incident light wavelength is 780 nm, the distance $h_7$ from the slider floating surface to the portion increased in width is 250 nm, and the distance $W_4$ from the edge 39 of the protruding portion to the center is 200 nm. FIG. 18 shows that the smaller the distance $h_8$ from the lower part of the protrusion to the slider floating surface, the larger the optical near-field intensity, and that the optical near-field intensity becomes approximately constant when the distance $h_8$ reaches 200 nm or less, that is, a height $h_9$ of the protruding portion reaches 50 nm or more. For this reason, in this example, the height $h_9$ of the protruding portion is set to 50 nm or more.

Figure 19:
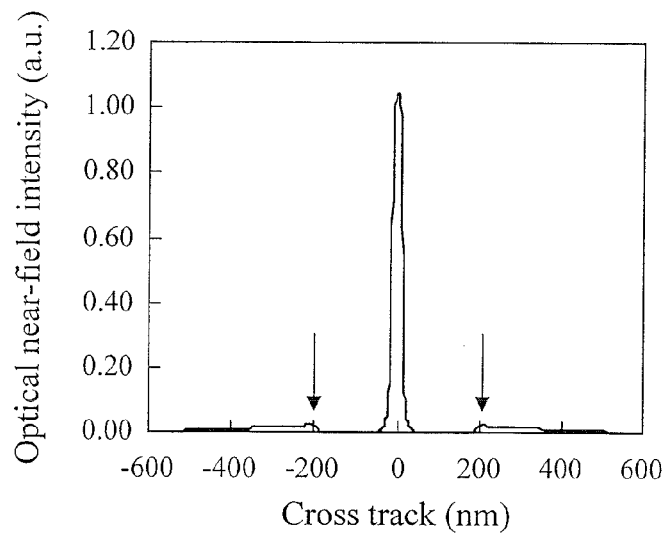
FIG. 19 is a graph showing a light intensity distribution on the medium surface when the protrusion formed in the lower part of the wide portion of the scatterer comes into contact with the floating surface.

In the case where the protrusion 34 is formed in the lower part of the portion 33 increased in width, the medium may be heated by light scattered by the lower part of the protrusion, when the distance $h_8$ from the lower part of the protrusion to the slider floating surface is set to 0, that is, the protrusion 34 is caused to come into contact with the slider floating surface. FIG. 19 shows a light intensity distribution (a distribution in the y direction in FIG. 2) on the medium surface when $h_8$=0. FIG. 19 shows that the light intensity is high also in the lower part of the protrusion. When the light intensity is high near the lower part of the protrusion as described above, the medium is heated in that portion and information recorded on the medium is erased. To prevent this, the distance $h_8$ from the lower part of the protrusion to the slider floating surface is preferably set to be larger than 0. The dotted line in FIG. 18 shows a relationship between the intensity of the optical near-field generated near the lower part of the protrusion (i.e., the intensity on the medium surface) and the distance $h_8$ from the lower part of the protrusion to the slider floating surface. As shown in FIG. 18, when the distance $h_8$ is set to 10 nm or more, the intensity of the optical near-field generated near the lower part of the protrusion can be set to approximately 0. Therefore, the distance $h_8$ is preferably set to 10 nm or more.

Figure 20:
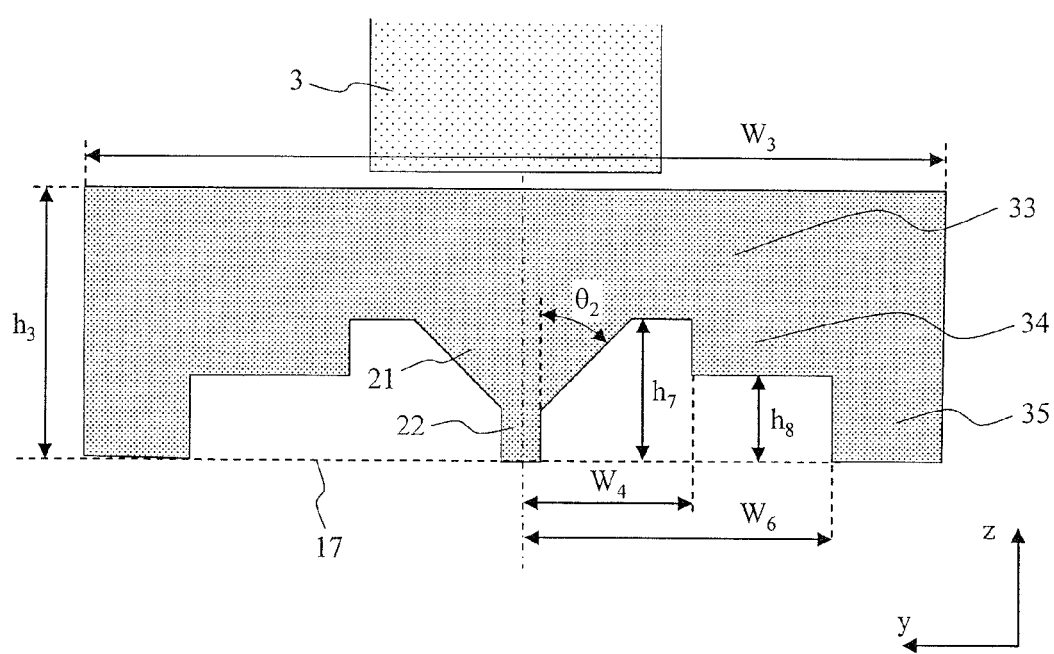
FIG. 20 is a view showing a case where a part of the protrusion formed in the lower part of the wide portion of the scatterer comes into contact with the floating surface.

When the distance $h_8$ from the lower part of the protrusion 34 to the slider floating surface is set to be larger than 0 as described above, portion of the protrusion 34 may be caused to come into contact with the slider floating surface 17 as shown in FIG. 20. When the slider is floating above the medium 14, there is a high-speed airflow between the slider floating surface and the medium. When the portion of the protrusion 34 is provided on the slider floating surface as described above, heat generated in the scatterer escapes into the air between the slider and the medium (i.e., the scatterer is cooled by the airflow). Thus, temperature rise of the scatterer can be suppressed. However, when the distance from the center of the scatterer to the portion 35, of the scatterer, in contact with the slider floating surface is too small, the medium is heated near the portion 35, of the scatterer, in contact with the slider floating surface as described above. To prevent this, a distance $W_6$ from the center of the scatterer to the portion 35, of the scatterer, in contact with the slider floating surface is preferably set to be larger than ½ of the spot diameter of the incident light, i.e., the mode field diameter of the waveguide 3. In this example, the width $W_3$ of the upper part of the scatterer is set to 6 μm, and the distance $W_6$ from the center of the scatterer to the portion 35, of the scatterer, in contact with the slider floating surface is set to 2 μm.

Figure 21:
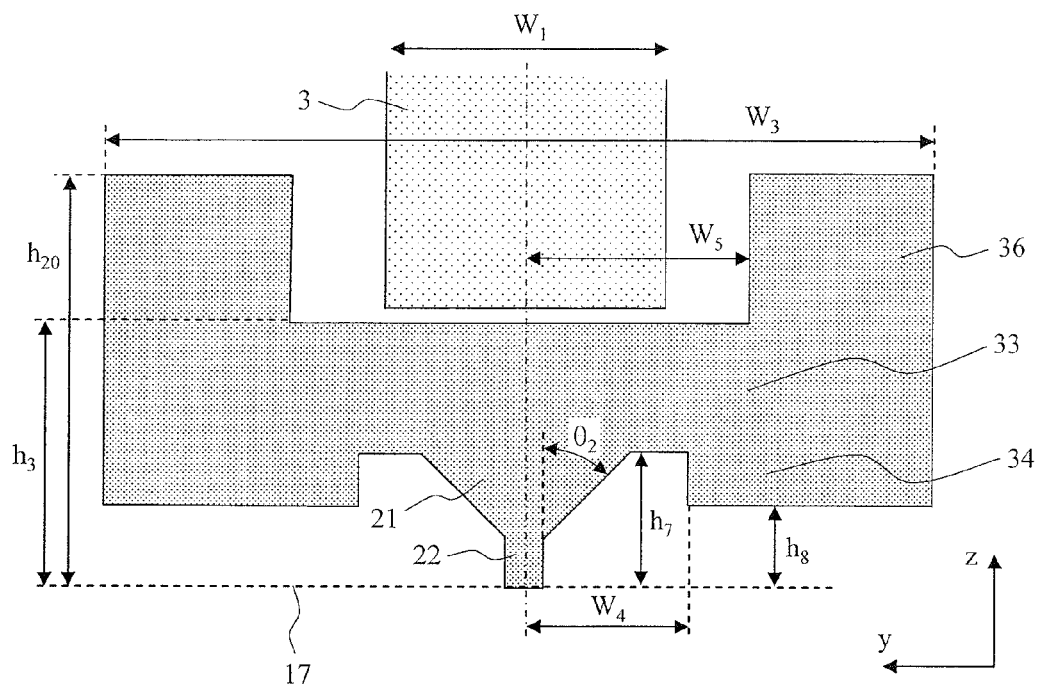
FIG. 21 is a view showing a case where a protrusion is formed in an upper part of the wide portion of the scatterer.

In order to further improve the radiation properties of the scatterer, a protrusion 36 may be formed in the upper part of the scatterer as shown in FIG. 21. In other words, a height $h_{20}$ of the scatterer at both ends in a track width direction may be set to be larger than the height $h_3$ of the scatterer in the center of the scatterer. This structure allows the volume of the scatterer to be increased, thereby improving the radiation properties and enabling further reduction in temperature rise of the scatterer. However, in this event, when a distance $W_5$ from the center of the waveguide core 3 to the protrusion 36 in the upper part of the scatterer is too small, the light transmitted through the waveguide is scattered or absorbed by the protrusion 36 of the scatterer, resulting in a reduction in the intensity of the light emitted from the exit of the waveguide. To prevent this, it is necessary to set a sufficiently large value for the distance $W_5$ from the center of the waveguide core 3 to the protrusion 36 in the upper part of the scatterer.

Figure 22:
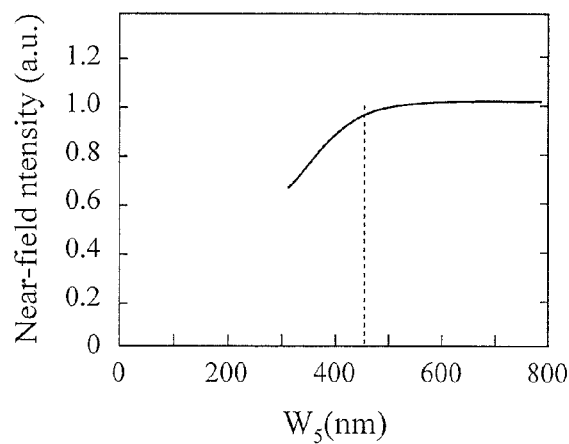
FIG. 22 is a graph showing a relationship between optical near-field intensity and a distance from the protrusion formed in the upper part of the wide portion of the scatterer to the center of the waveguide.

FIG. 22 shows a relationship between the distance $W_5$ from the center of the waveguide core 3 to the protrusion 36 in the upper part of the scatterer and the intensity of the optical near-field generated at the apex 20 of the scatterer. Here, the width $W_1$ of the waveguide core 3 is 500 nm, the width $W_3$ of the upper part of the scatterer is 10 μm, the height h3 of the scatterer in the center portion is 500 nm, and the height $h_{20}$ of the scatterer at the both ends thereof is 5 μm. As shown in FIG. 22, when the distance $W_5$ from the center of the waveguide core to the protrusion 36 in the upper part of the scatterer is 450 nm or less, the optical near-field intensity is reduced. In the waveguide of this example, a mode field diameter of the light transmitted through the waveguide (i.e., a spot diameter measured at a position where the intensity reaches 1/e$^2$ of the peak intensity) is about 600 nm. However, evanescent light seeps out to the outside of the waveguide core 3, and thus the light spot diameter, in the waveguide, including the light that seeps out is 900 nm (about 1.5 times the mode field diameter). Therefore, when the distance $W_5$ from the center of the waveguide core 3 to the protrusion 36 in the upper part of the scatterer is smaller than ½ of 900 nm, the evanescent light hits against the scatterer 36 and thus the light intensity in the waveguide is reduced. To prevent this, the distance $W_5$ from the center of the waveguide core to the protrusion 36 in the upper part of the scatterer is preferably set to be equal to or greater than 1.5×½=0.75 times the mode field diameter of the waveguide. In this example, the distance $W_5$ from the center of the waveguide core 3 to the protrusion 36 in the upper part of the scatterer is set to 700 nm.

Figure 32:
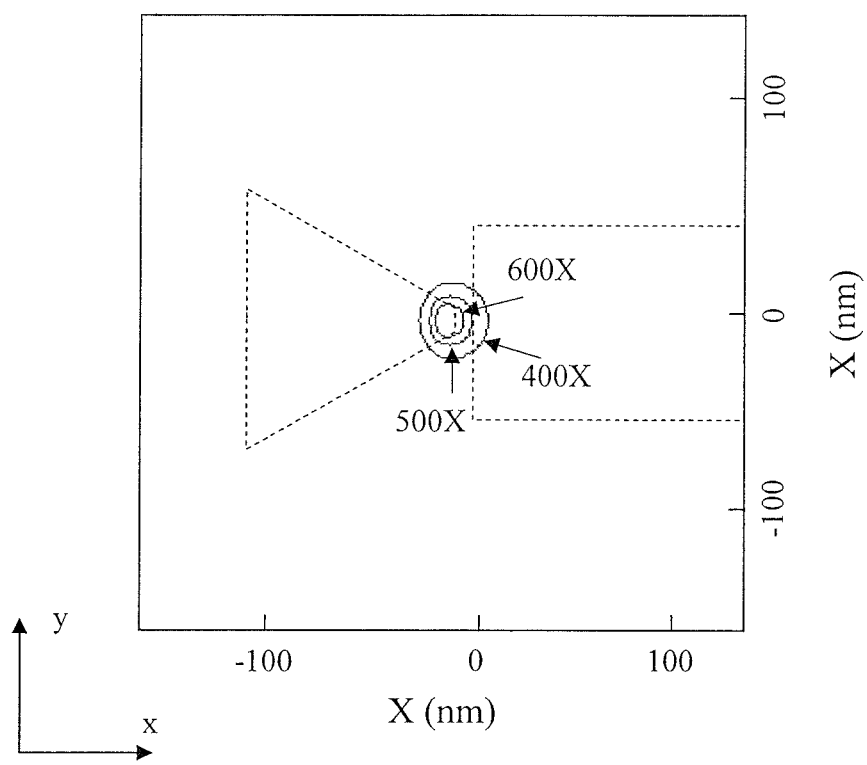
FIG. 32 is a view showing an intensity distribution of optical near-field generated on the medium surface by an optical near-field generating unit of the present invention.

FIG. 32 shows an optical near-field intensity distribution on the surface of the recording medium when an optical near-field is generated using the optimum structure in the above example. Here, the incident light wavelength is 980 nm, and the material of the periphery of the scatterer 1 is $Al_2O_3$. In FIG. 32, the value of the optical near-field intensity represents an intensity ratio when the incident light intensity is 1. As shown in FIG. 32, a strong optical near-field is generated near the apex 20 of the scatterer, and the intensity of the optical near-field is about 600 times the incident light intensity.

Figure 23A:
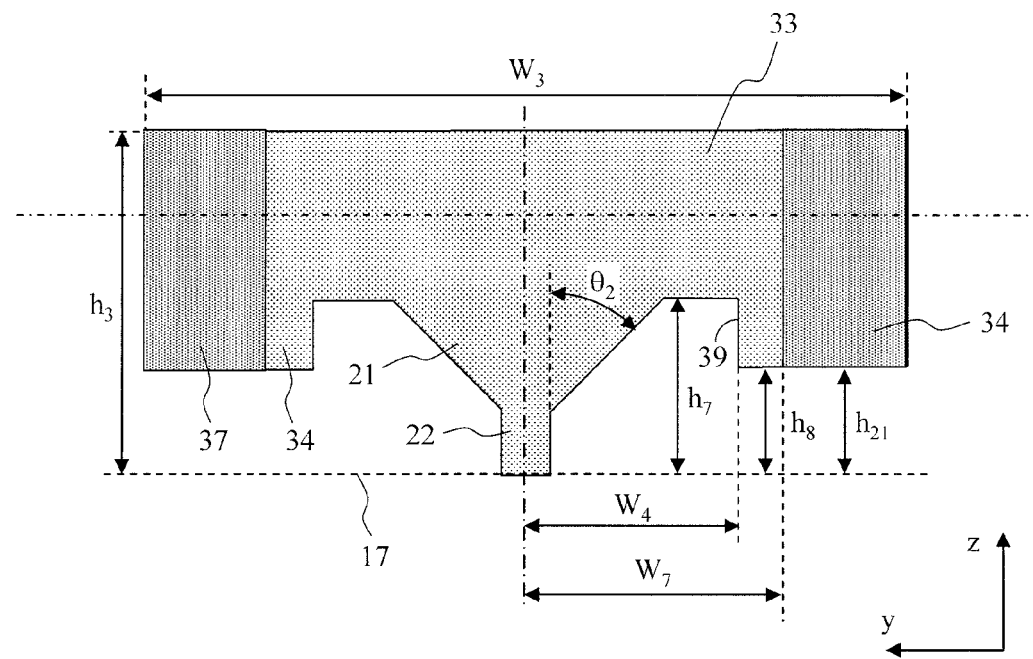
FIG. 23A is a cross-sectional side view and FIG. 23B is a top view showing a case where the wide portion of the scatterer is partially increased in thickness.
Figure 23B:
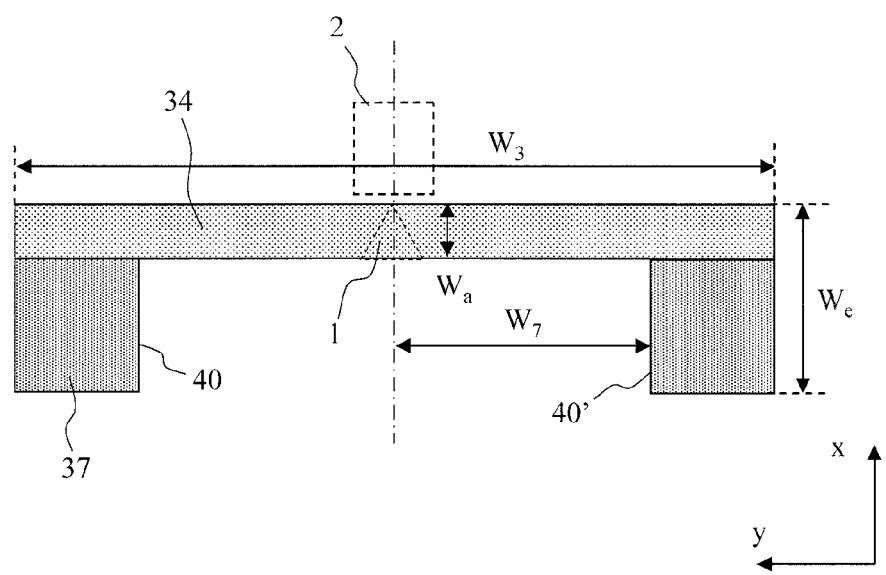

In the above example, the width Wa of the scatterer in the direction (the x direction in FIG. 2) parallel to the polarization direction of the incident light is set to be constant at every location on the scatterer. However, the width of the scatterer in the x direction (hereinafter called the thickness of the scatterer) may be changed in a part of the scatterer. FIG. 23 shows an example where the thickness of the scatterer is increased at both ends of the scatterer. FIG. 23A is a side view of the scatterer, and FIG. 23B is a top view of the scatterer. Here, the scatterer is increased in thickness at the ends in the track width direction so that it protrudes in a direction opposite to the apex 20 where the optical near-field is generated. This increase in thickness of a part of the scatterer allows the volume of the scatterer to be increased, thus improving radiation properties. Moreover, as described later, the intensity of the optical near-field generated at the apex 20 is also increased. Thus, the incident light power can be reduced. For these reasons, the temperature rise of the scatterer can be further suppressed.

Figure 24A:
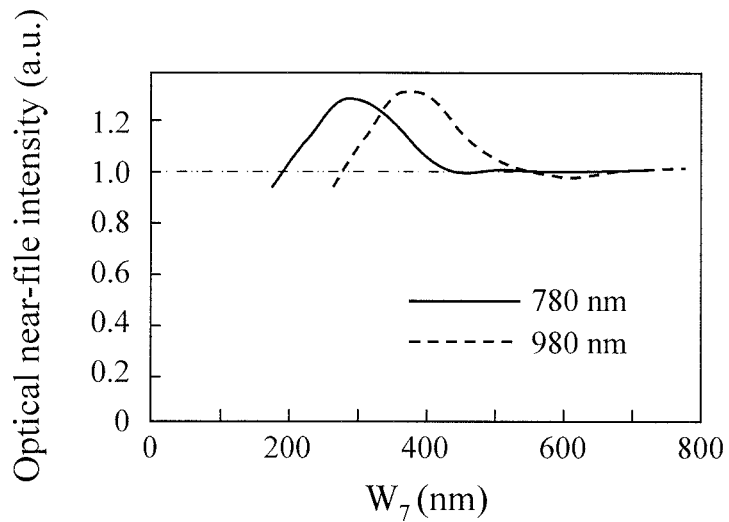
FIGS. 24A and 24B are graphs each showing a relationship between optical near-field intensity and a distance from the portion, of the scatterer, increased in thickness to the center of the scatterer, FIG. 24A showing the relationship for each wavelength, and FIG. 24B showing a case where a material around the scatterer is changed.

FIG. 24 shows a relationship between the intensity of the optical near-field generated at the apex 20 and a distance $W_7$ from the center of the scatterer to an edge 40 of a portion 37, of the scatterer, which is increased in thickness. Here, the incident light wavelength is 780 nm or 980 nm, a material of the portion increased in thickness is gold, which is the same as the material of the center part of the scatterer, and the material of the periphery of the scatterer is $Al_2O_3$. The width $W_3$ of the upper part of the scatterer is 6 μm, the height $h_3$ of the scatterer is 500 nm, and the distance $h_7$ from the slider floating surface to the portion increased in width and the distance $W_4$ from the edge 39 of the protrusion 34 to the center take values that satisfy the equations (5) and (8). As shown in FIG. 24, the intensity of the optical near-field generated at the apex 20 is high when the distance $W_7$ from the center of the scatterer to the edge 40 of the portion 37, of the scatterer, which is increased in thickness is within a certain range. For example, in the case where the wavelength is 780 nm, the intensity of the optical near-field is increased when the distance $W_7$ from the center of the scatterer to the edge 40 of the portion 37 increased in thickness is within a range between 200 nm and 420 nm.

Figure 25:
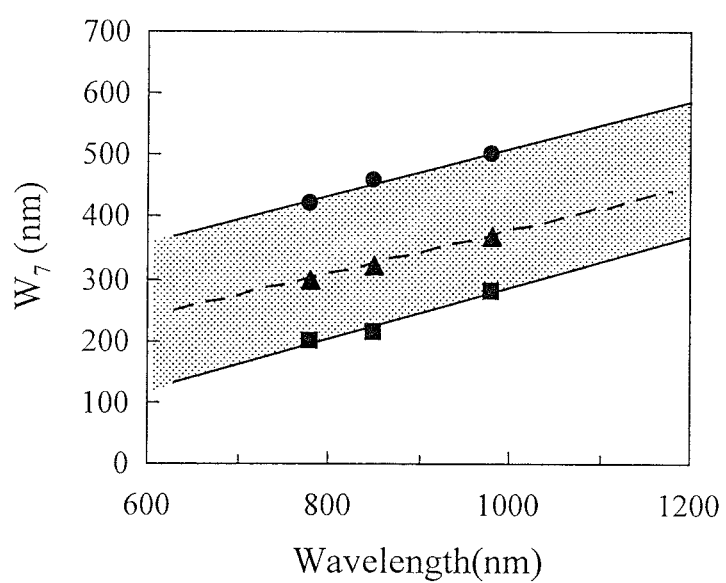
FIG. 25 is a graph showing a relationship between the wavelength and an optimum range of the distance from the portion, of the scatterer, increased in thickness to the center of the scatterer.

FIG. 25 shows a relationship between the wavelength and the optimum range of the distance $W_7$ from the center of the scatterer to the edge 40 of the portion 37. Each of the triangles indicates a distance when the optical near-field intensity is at its maximum, each of the circles indicates a maximum value in the optimum range, and each of the squares indicates a minimum value in the optimum range. When the incident light wavelength is λ, the optimum range is expressed as follows using an approximate equation (the unit is nm).

$$0.413\lambda - 127 \le W_7 \le 0.388\lambda + 122 \quad (9)$$

Figure 24B:
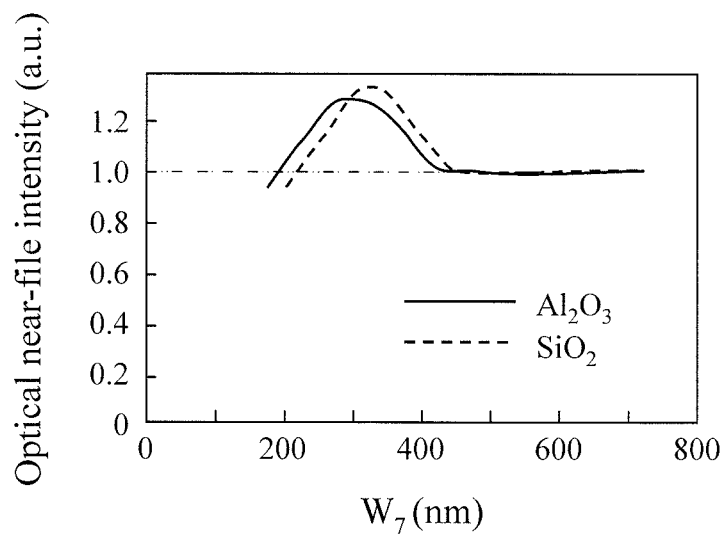

The optimum range of the distance $W_7$ from the center of the scatterer to the edge 40 is dependent on the refractive index of the material of the periphery of the scatterer. FIG. 24B shows a relationship between the distance $W_7$ and the optical near-field intensity when the wavelength is 780 nm and the material of the periphery of the scatterer is changed from $Al_2O_3$ (refractive index=1.63) to $SiO_2$ (refractive index=1.45). The solid line indicates the case of $Al_2O_3$, and the dotted line indicates the case of $SiO_2$. FIG. 24B shows that the smaller the refractive index of the material of the periphery, the larger the optimum value of the distance $W_7$. When the wavelength is 780 nm, the optimum value in the case of $SiO_2$ is 1.07 times greater than that in the case of $Al_2O_3$. A result of checking a difference in optimum value for the wavelengths other than 780 nm also shows that the optimum value in the case of $SiO_2$ is about 1.07 times greater than that in the case of $Al_2O_3$. Therefore, the optimum range in the case of $SiO_2$ is obtained by multiplying the above equation (9) by 1.07. When a material other than $Al_2O_3$ and $SiO_2$ is used for the periphery, it is only necessary to approximately multiply the equation (9) by the following equation (10).

$$\frac{1.07-1}{1.45-1.63} \times (n-1.63) + 1 = -0.39 \times (n-1.63) + 1 \quad (10)$$

That is, the optimum range is expressed as follows (the unit is nm).

$$(0.413\lambda - 127)\{-0.39 \times (n-1.63)+1\} \le W_7 \le (0.388\lambda + 122)$$
$$\{-0.39 \times (n-1.63)+1\} \quad (11)$$

As described above, the optical near-field intensity is increased by increasing the thickness of the scatterer at the both ends thereof in the track width direction. This is considered to be because of the following reason. Specifically, when the light emitted from the exit of the waveguide hits against the portion 37 increased in thickness, side surfaces 40 and 40' of the portion 37 increased in thickness reflect the light. When a distance between the side surfaces 40 and 40' is optimized, the light reflected by the side surface 40 and that reflected by the side surface 40' interfere with each other, thus increasing the intensity in the center portion. The scatterer 1 serves not only to propagate plasmons but also as an antenna which collects light energy and converts the energy into charge oscillation in the scatterer. Therefore, when the intensity of the incident light is increased in the center portion of the scatterer, the energy is more efficiently collected in the scatterer, thereby increasing the optical near-field intensity.

Figure 26A:
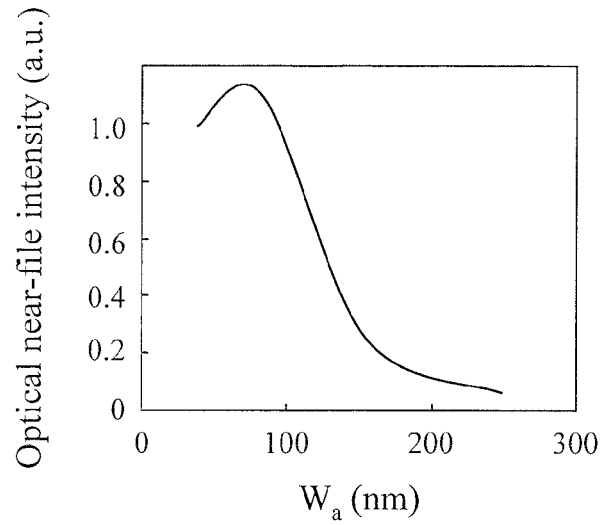
FIGS. 26A and 26B are graphs each showing a relationship between the thickness of the scatterer and optical near-field intensity, FIG. 26A showing a relationship at the center of the scatterer, and FIG. 26B showing a relationship at both ends of the scatterer.
Figure 26B:
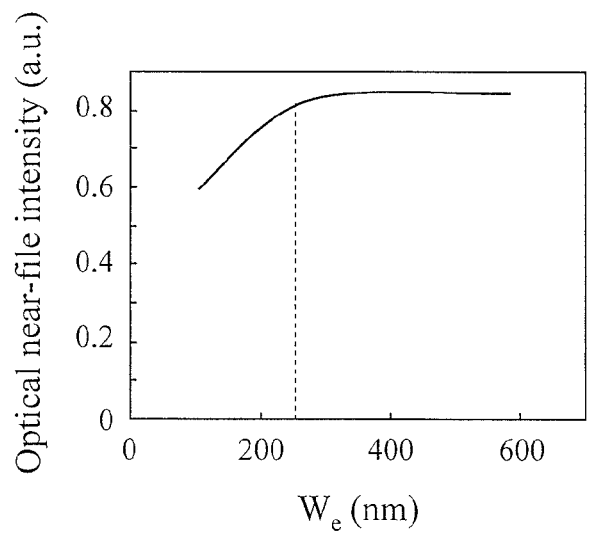

FIGS. 26A and 26B each show a relationship between the thickness of the scatterer (the width of the scatterer in the x direction) and the optical near-field intensity.

FIG. 26A shows a relationship between a thickness $W_a$ of the scatterer in the center portion and the optical near-field intensity. FIG. 26B shows a relationship between the optical near-field intensity and a thickness $W_e$ of the scatterer in the portion increased in thickness at both ends of the scatterer. In the center portion of the scatterer, plasmons are transmitted in the scatterer. Therefore, the thickness of the scatterer needs to be set to a thickness at which the plasmons are excited. For example, when the wavelength is 780 nm, the material of the scatterer is gold, and the material of the periphery of the scatterer is $Al_2O_3$, an optimum thickness is about 80 nm. Meanwhile, when the wavelength is 980 nm and the same materials are used, the optimum thickness is about 100 nm. As shown in FIG. 26A, in the center portion of the scatterer, the plasmons are not excited with a thickness different from that described above, resulting in a reduction in intensity of the optical near-field generated. On the other hand, at both ends of the scatterer, the optical near-field intensity is increased with the increase in the thickness $W_a$ of the scatterer, and reaches a constant value when the thickness $W_a$ reaches 300 nm. That is, the thickness of the scatterer is preferably set to 250 nm or more at the both ends of the scatterer. The reason why it is preferable to increase the thickness of the scatterer as described above is considered to be because too small a thickness of the scatterer reduces an amount of light to be reflected by the side surfaces 40 and 40' of the portions 37 increased in thickness, and thus the effect of interference is reduced.

Figure 27:
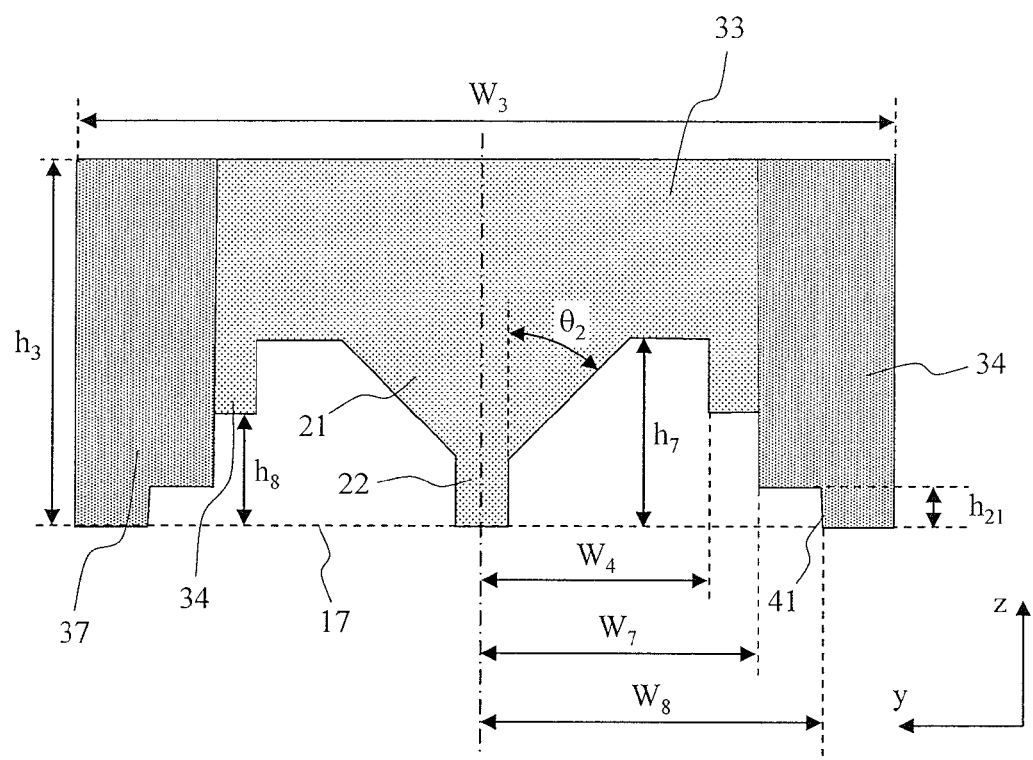
FIG. 27 is a view showing a case where a part of the portion, of the scatterer, increased in thickness comes into contact with the floating surface.

When the scatterer is partially increased in thickness as described above, a part of the portion 37 increased in thickness may be caused to come into contact with the slider floating surface as shown in FIG. 27. When the scatterer is allowed to partially come into contact with the floating surface, heat in the scatterer escapes into the air between the slider and the medium, and thus temperature rise of the scatterer can be reduced. However, as in the case of FIG. 20, when a distance $W_8$ from an edge 41 of the portion in contact with the slider floating surface to the center of the scatterer is too small, the light intensity is increased near the edge 41 of the portion in contact with the slider floating surface and the medium is heated. To prevent this, the distance $W_8$ from the edge 41 of the portion in contact with the slider floating surface to the center of the scatterer is preferably set to be equal to or larger than ½ of the mode field diameter of the waveguide. In this example, a distance $h_{21}$ from the slider floating surface to the portion increased in thickness in the portion not in contact with the slider floating surface is set to 100 nm, the width $W_3$ of the upper part of the scatterer is set to 10 µm, and the distance $W_8$ from the edge 41 of the portion in contact with the slider floating surface to the center of the scatterer is set to 2 µm.

The metal material of the portion 37, of the scatterer, which is increased in width is the same as that of the center portion of the scatterer in the above example, but may be different from that of the center portion of the scatterer. For example, when the material of the center portion of the scatterer is gold, the same material, that is, gold is used for the portion 37 increased in thickness, and an amount of gold used is increased, leading to an increase in manufacturing costs. On the other hand, the manufacturing costs can be reduced by using copper, silver, aluminum, chromium, tungsten or the like for the material of the portion 37 increased in thickness.

Figure 28A:
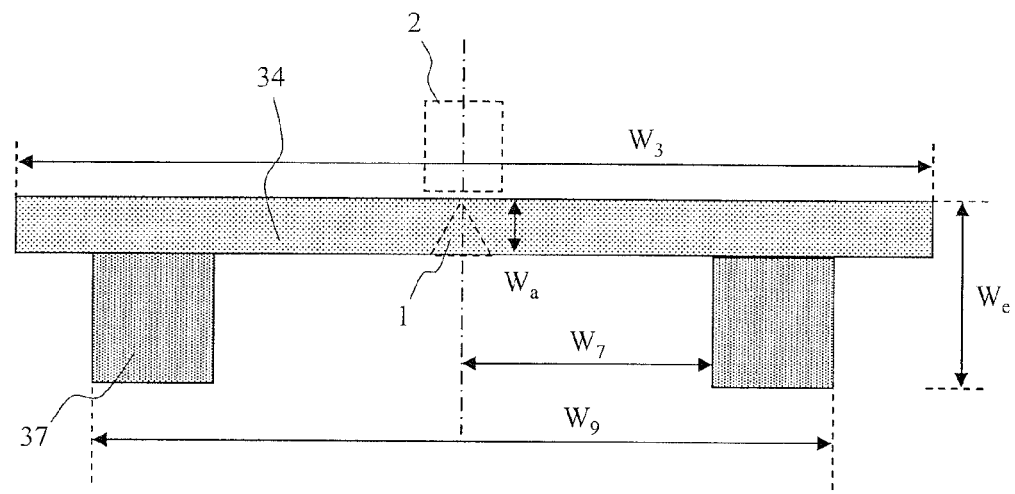
FIGS. 28A and 28B are views showing a case where the thickness of the scatterer is partially increased, FIG. 28A showing a case where the width of the wide portion is different from the width of the portion increased in thickness, and FIG. 28B showing a case where the width is increased also on the apex side where optical near-field is generated.

In the above example, a distance $W_9$ from the surface, of the portion 37 increased in thickness, opposite to the center of the scatterer to the surface, of the other portion 37 increased in thickness, opposite to the center of the scatterer is set to be equal to the width $W_3$ of the upper part of the scatterer. However, the distance $W_9$ may be set to be different from the width $W_3$ as illustrated in FIG. 28. In this example, $W_3=10$ µm, and $W_9=6$ µm.

Figure 28B:
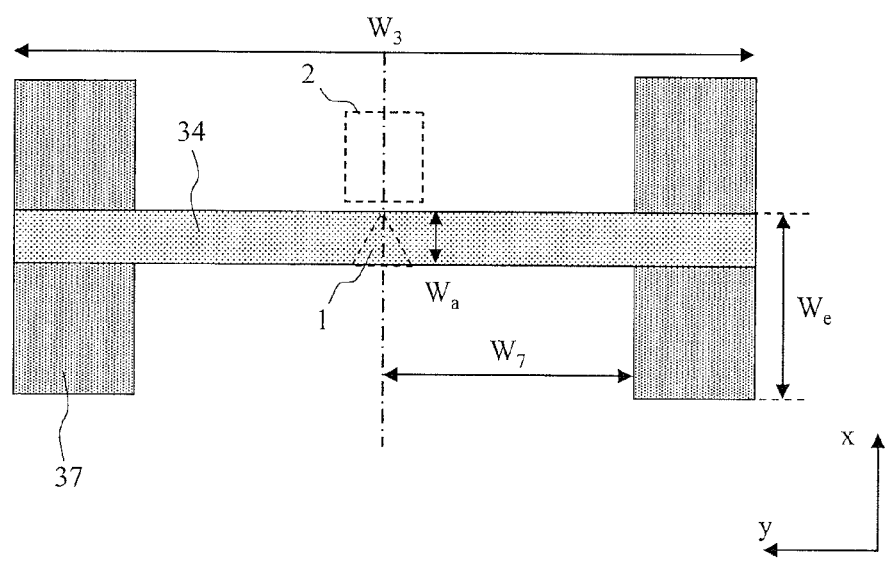

In the above example, the scatterer is increased in thickness so that it protrudes in the direction opposite to the apex 20 where the optical near-field is generated. On the other hand, as shown in FIG. 28B, the scatterer may be increased in thickness so that it protrudes also in the same direction as the apex 20 where the optical near-field is generated. In this way, the optical near-field intensity can be further increased.

Figure 37:
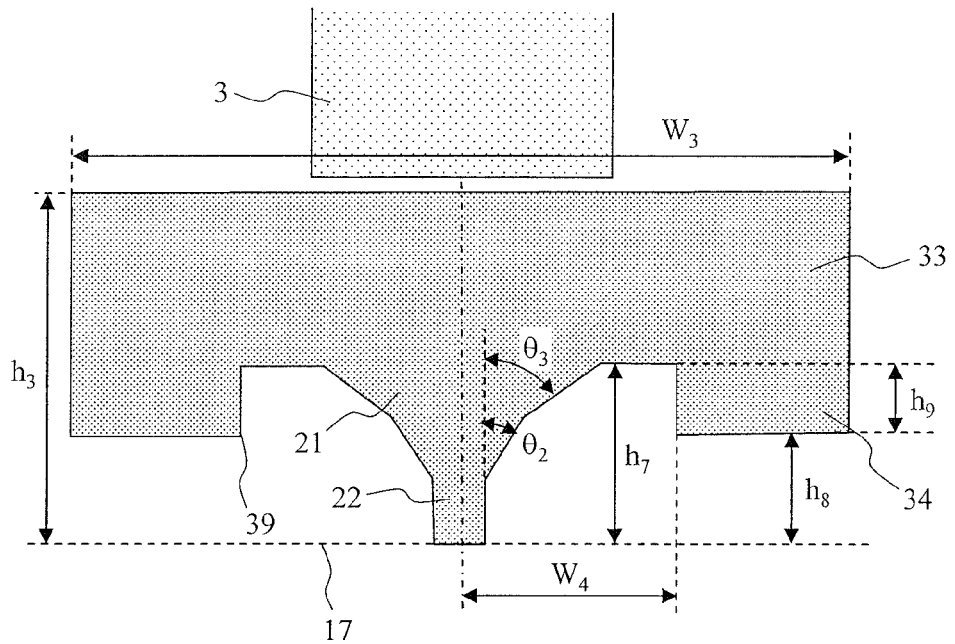
FIG. 37 is a view showing a case where an angle of a tapered portion is gradually changed.

In the scatterer of the present invention having the upper part increased in width, the spread angle $\theta_2$ of the tapered portion may be changed in a stepwise fashion as shown in FIG. 37. In this example, the height $h_3$ of the scatterer is 400 nm, a height $h_6$ of a portion that is not tapered is 70 nm, and the angle of the tapered portion 21 is changed in two steps, i.e., $\theta_2=40°$ and $\theta_3=60°$. A boundary between the portions of $\theta_2=40°$ and $\theta_3=60°$ is located at a position where the distance from the floating surface is 150 nm. The increase in width of the upper part of the tapered portion makes excited plasmons likely to be focused in the upper part of the scatterer. Thus, the optical near-field intensity can be further increased.

Figure 38:
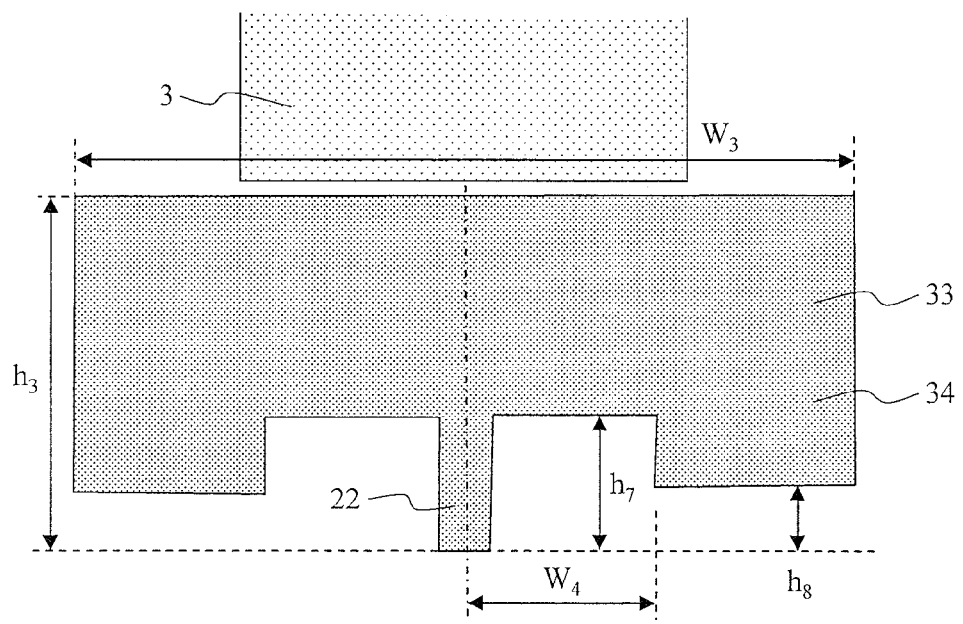
FIG. 38 is a view showing a case without a tapered portion.

In the scatterer of the present invention having the upper part increased in width, the upper part of the scatterer may be increased in width without providing a tapered portion as shown in FIG. 38. In machining of a slider, a distance $h_6$ between the tapered portion 21 and the slider floating surface 17 is determined by a slider lapping amount. In this event, the distance $h_6$ varies due to a machining error. When no tapered portion is provided, a characteristic change due to the variation in the distance $h_6$ can be reduced.

Although gold is used as the material of the scatterer of the present invention having the upper part increased in width, any other material may be used as long as they are conductive. However, in order to generate a strong optical near-field, it is preferable to use a highly conductive material, such as gold, silver, copper, aluminum or an alloy obtained by combining any of them. When a different material is used, parameters such as the distance $h_7$ from the slider floating surface to the portion increased in width are preferably adjusted according to the material used. When silver, copper or an alloy thereof is used, optimum ranges of the respective parameters are approximately the same when gold is used, in the range of red to near-infrared wavelengths.

In the case of using the scatterer of the present invention having the upper part increased in width, a distance $D_w$ (see FIG. 3) from the upper part of the scatterer 1 to the waveguide core 3 is preferably set small. When the distance $D_w$ from the upper part of the scatterer 1 to the waveguide core 3 is increased, the light emitted from the tip of the waveguide core 3 diffuses before reaching the scatterer 1. As a result, an energy density of light reaching the scatterer is reduced, and thus intensity of an optical near-field to be generated is also reduced. In this example, the distance $D_w$ from the upper part of the scatterer 1 to the waveguide core 3 is set within a range between 0 nm and 50 nm.

Figure 29:
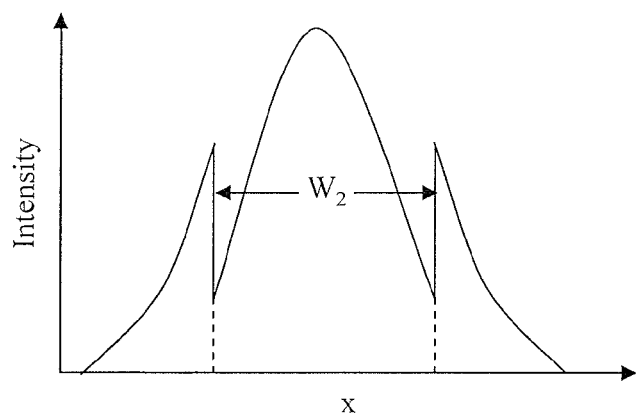
FIG. 29 is a graph showing a light intensity distribution in the waveguide.

In the embodiment of the present invention, the waveguide core 3 is disposed so that an edge 29, of the core 3, on the pole side is positioned near the apex 20 of the scatterer, as shown in FIG. 3. There is also a method wherein the core is disposed so that the scatterer 1 is positioned in the center portion of the core 3. In this case, however, the edge of the waveguide core 3 comes close to the pole 27. As shown in FIG. 29, evanescent light seeps out into a clad part of the waveguide. When a distance between the pole and the clad of the waveguide is small, evanescent light components seeping out into the clad hit against the pole, and the light is scattered or absorbed by the pole. As a result, the intensity of the light emitted from the exit of the waveguide is reduced. To prevent this, the waveguide core 3 is disposed so that the edge of the core 3 is positioned near the apex 20 of the scatterer. In this case, there is high-intensity evanescent light in the clad part of the waveguide. This evanescent light excites plasmons in the scatterer.

Figure 30:
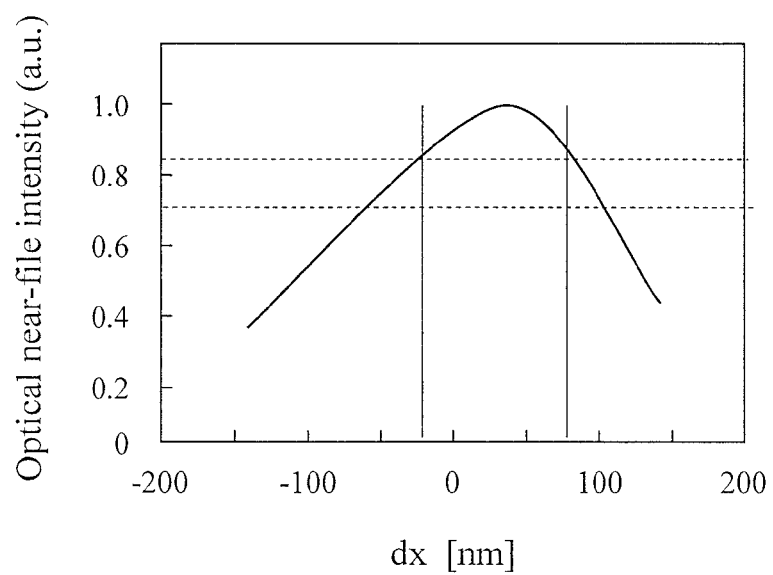
FIG. 30 is a graph showing a relationship between optical near-field intensity and a distance between a core end of the waveguide and a tip of the scatterer.

FIG. 30 shows a relationship between the intensity of the optical near-field generated at the apex 20 and a distance dx (see FIG. 3) in the x direction between the edge 29 of the waveguide core 3 and the apex 20 of the scatterer. The distance dx takes a positive value when the apex 20 of the scatterer protrudes toward the clad further than the edge 29 of the core. Here, the scatterer 1 has the same shape as that in the case of FIG. 15. When dx is changed, the optical near-field intensity is changed. To achieve a recording density of 1.5 Tb/in$^2$ or higher, it is necessary to heat the medium to a temperature of 250° C. or higher. To heat the medium up to that temperature, however, it is necessary to set the optical near-field intensity to be 70% or more of the peak intensity. The intensity is obtained when dx is within a range between −70 nm and 100 nm. Therefore, to achieve the recording density of 1.5 Tb/in$^2$ or higher, dx is preferably set within a range between −70 nm and 100 nm. Meanwhile, to achieve a recording density of 2.5 Tb/in$^2$ or higher, it is necessary to heat the medium to a temperature of 300° C. or higher. To heat the medium up to that temperature, however, it is necessary to set the optical near-field intensity to be 84% or more of the peak intensity. The intensity is obtained when dx is within a range between −20 nm and 80 nm. Therefore, to achieve the recording density of 2.5 Tb/in² or higher, dx is preferably set within a range between −20 nm and 80 nm.

Figure 31:
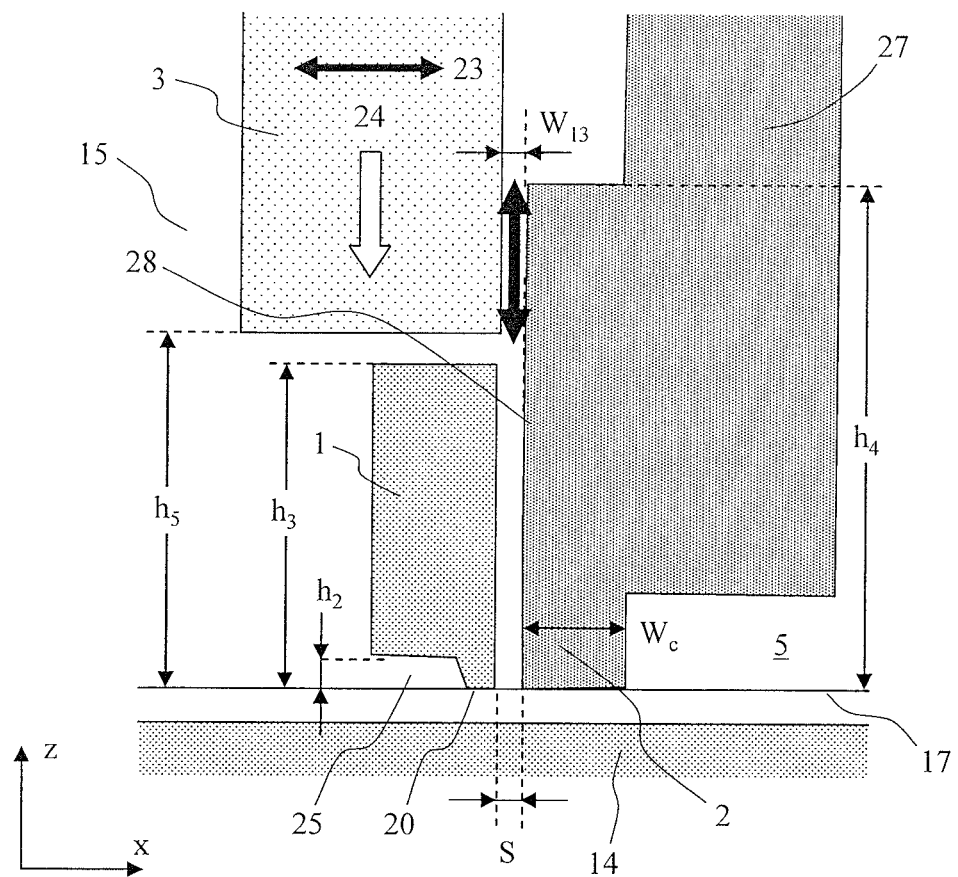
FIG. 31 is a view showing a case where a height of the main pole is set to be larger than that of the scatterer.

In order to generate a strong magnetic field at the tip of the main pole in the above recording head, the height $h_4$ of the main pole 2 is preferably large. The larger the height $h_4$ of the main pole 2, the larger the area of the connection between the thick portion 27 of the pole and the main pole 2. Thus, the larger height $h_4$ facilitates the flow of a magnetic flux into the main pole 2, thus making it possible to increase the strength of the magnetic field generated at the tip of the main pole. However, too large a height of the main pole increases propagation loss of the waveguide. The reason is that, as shown in FIG. 31, when the height $h_4$ of the main pole is larger than the height $h_3$ of the scatterer, the waveguide core 3 comes closer to the main pole 2. In this case, evanescent light components seeping out into the clad hit against the main pole 2 in a portion (indicated by the thick arrow) where the core 3 and the main pole 2 are adjacent to each other. As a result, the light intensity in the waveguide is reduced. To prevent this, it is preferable that the height $h_4$ of the main pole and the height $h_3$ of the scatterer are set substantially the same as shown in FIG. 3, or the height of the main pole is set to be smaller than the height of the scatterer. For example, in the example shown in FIG. 15, the height $h_4$ of the main pole is set to 500 nm when the height $h_3$ of the scatterer is set to 500 nm.

Figure 33A:
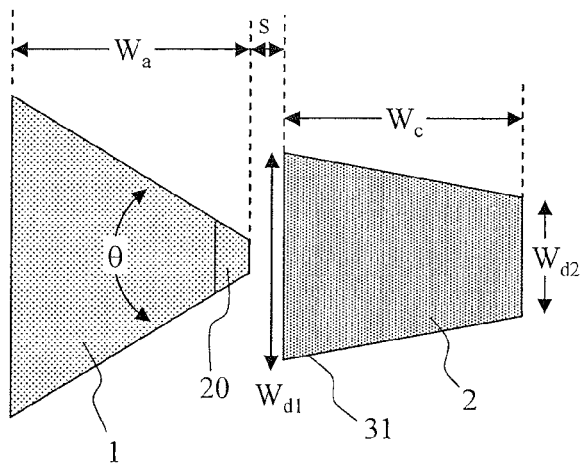
FIGS. 33A to 33C are views each showing a cross-sectional shape of the tip of the main pole, FIG. 33A showing the case of a trapezoidal shape, FIG. 33B showing the case where the width of the pole is equal to or smaller than the width of the tip of the scatterer, and FIG. 33C showing the case where a dent is formed near the apex where the optical near-field is generated.

The main pole has a rectangular cross-section as shown in FIG. 4 in the above example, but may have a trapezoidal cross-section as shown in FIG. 33A. This trapezoidal cross-section of the main pole can increase the strength of the magnetic field on the side closer to the position of heating with the optical near-field. Accordingly, recording can be performed on a medium with higher coercivity, and thus the recording density can be improved. In this example, a width $W_{d1}$ of the pole on the side closer to the apex 20 where the optical near-field is generated is set to 150 nm, and a width $W_{d2}$ of the pole on the opposite side is set to 100 nm.

Figure 33B:
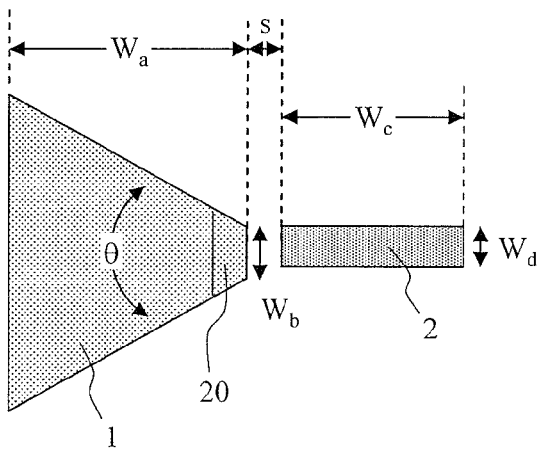

When the cross-sectional shape of the main pole is set to be a rectangular shape or a trapezoidal shape, the width $W_d$ of the main pole 2 is set substantially equal to the width $W_b$ of the apex of the scatterer 1 as shown in FIG. 33B, or may be set smaller than $W_b$. A strong magnetic field is likely to be generated at an edge portion 31, shown in FIG. 33A, of the tip of the pole. When $W_d > W_b$, there is a possibility that a strong magnetic field is applied to an adjacent track and data on the adjacent track is erased. On the other hand, when $W_d < W_b$ or $W_d = W_b$, application of a magnetic field to the adjacent track can be suppressed. In this example, $W_d = W_b = 20$ nm.

Figure 33C:
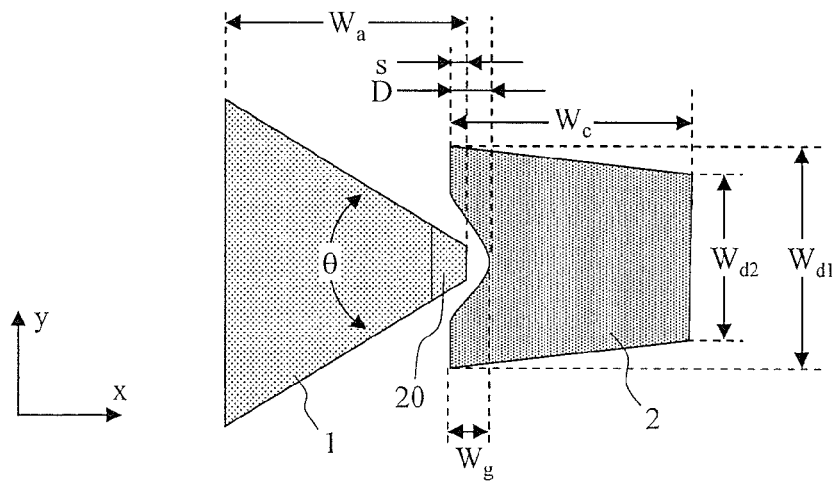
Figure 34:
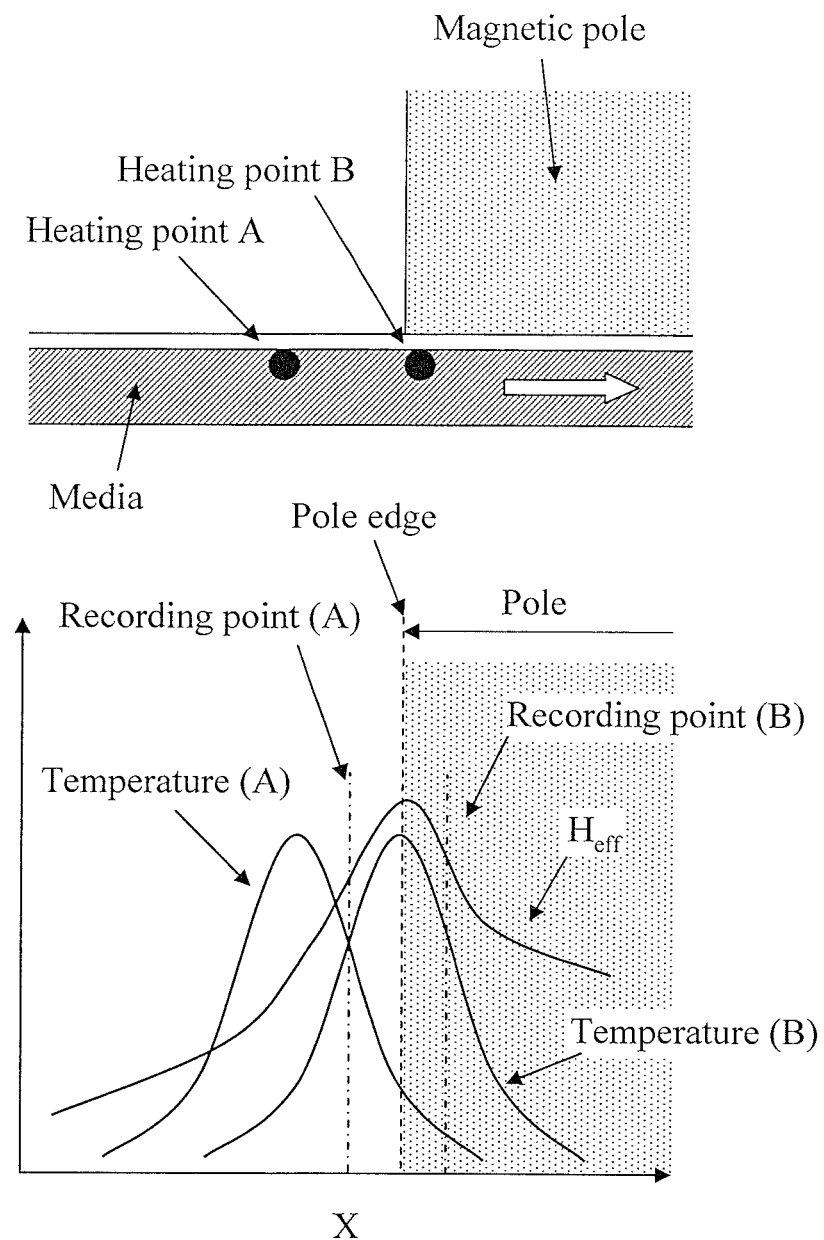
FIG. 34 is a view showing a relationship between a distance from the main pole and magnetic field strength.

As shown in FIG. 33C, the main pole 2 may be recessed in the vicinity of the apex 20 where the optical near-field is generated. This recess in a part of the main pole makes it possible to bring a heating position with light closer to the center of the main pole. In this event, the recording density can be improved for the following reasons.
(i) The closer to the edge of the main pole, the stronger the magnetic field gets. The recess in a part of the main pole makes it possible to bring the heating position with light closer to the center of the main pole, and thus the magnetic field strength can be increased at the heating position. As a result, recording can be performed on a medium with higher coercivity (or with a larger anisotropic magnetic field), thus enabling improvement of the recording density.
(ii) In thermally assisted magnetic recording, a boundary between recording bits (i.e., a recording point) is determined by a position where a temperature gradient dT/dx is at its minimum when the temperature is T. In this event, at the recording point, the smaller the gradient $dH_{eff}/dx$ of an effective magnetic field strength $H_{eff}$, the clearer the boundary between recording bits. Thus, a high recording density can be realized. The effective magnetic field strength $H_{eff}$ is increased at the edge portion of the main pole as shown in FIG. 34. A magnetic field gradient at the recording point is positive when the heating position is outside of the main pole (i.e., at a heating point A), whereas a magnetic field gradient at the heating position is negative when the heating position comes closer to the center of the main pole (i.e., at a heating point B). The position where dT/dx is at its minimum and the position where $dH_{eff}/dx$ is at its minimum can be overlapped with each other. Accordingly, the boundary between recording bits becomes clearer and a high recording density can be realized.

In this example, the width of the main pole at its tip is $W_c = 150$ nm, $W_{d1} = 120$ nm, and $W_{d2} = 100$ nm, and a recess amount D of the recessed portion is set to 50 nm. A distance s from the apex where the optical near-field is generated to the edge of the main pole is set to −10 nm. The symbol s takes a positive value when the apex where the optical near-field is generated is outside the main pole. Note that the tip may have a rectangular shape where $W_{d1}$ and $W_{d2}$ are both set to, for example, 120 nm.

Figure 35A:
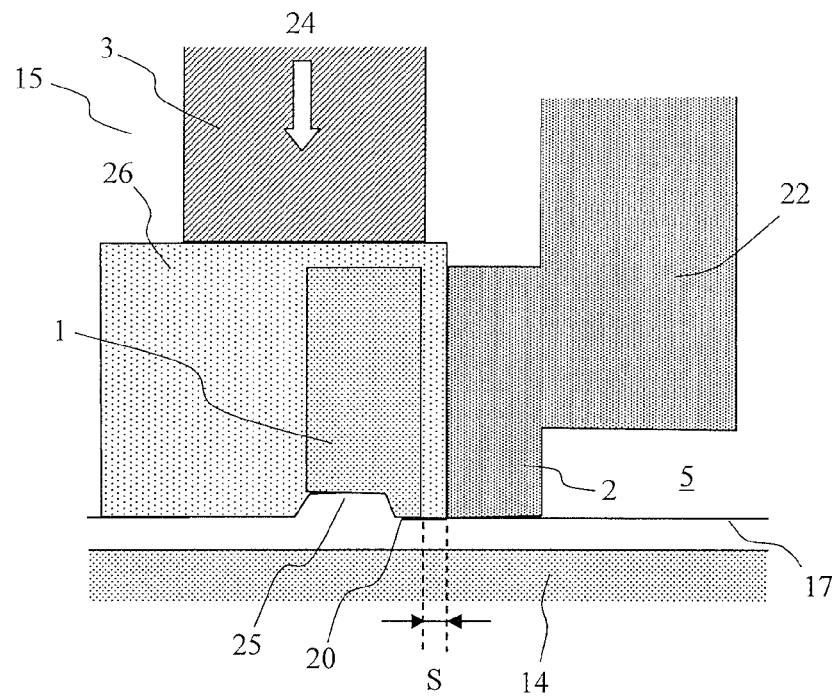
FIG. 35A is a cross-sectional side view and FIG. 35B is a view from the floating surface side showing a case where a material of a part of a periphery of the scatterer is set to be different from that of the other.
Figure 35B:
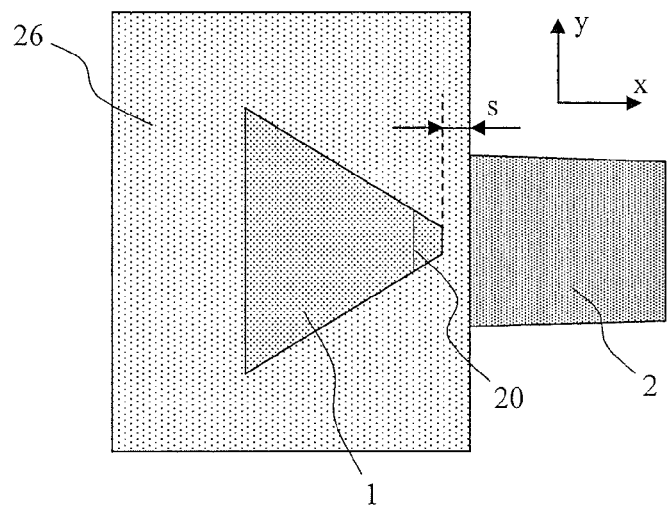

Although the material of the periphery of the scatterer is the same as that of the clad 15 of the waveguide in the above example, the material of the periphery 26 of the scatterer may be different from that of the clad 15 of the waveguide as shown in FIGS. 35A and 35B. For example, in the example shown in FIGS. 35A and 35B, the material of the clad 15 of the waveguide is $Al_2O_3$, and the material of the periphery 26 of the scatterer is $SiO_2$.

Figure 36A:
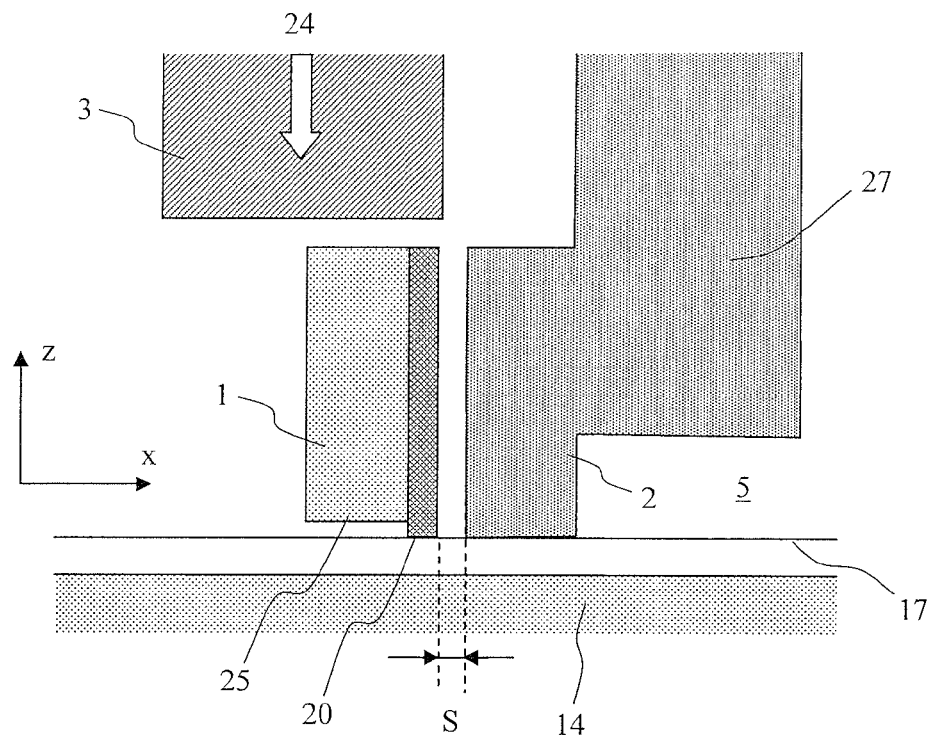
FIG. 36A is a cross-sectional side view and FIG. 36B is a view from the floating surface side showing a case where the material of the scatterer is different from that of the other portion at the apex where optical near-field is generated.
Figure 36B:
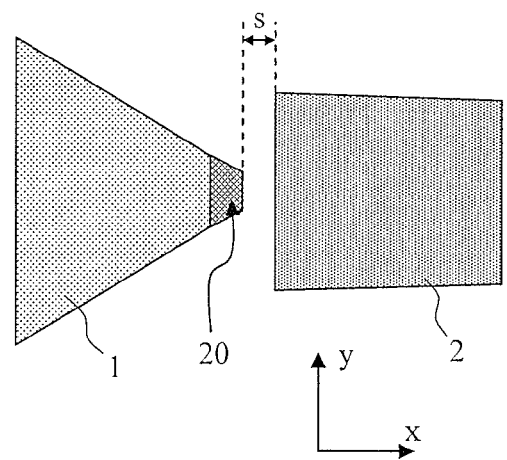

As the material making up the scatterer, different materials may be used to form respective parts of the scatterer. For example, in the example shown in FIGS. 36A and 36B, a different material from that in the other portion is used for the apex 20 where the optical near-field is generated, and a material harder than that of the main body part is used for the tip portion. The use of such materials makes the apex 20 where the optical near-field is generated less likely to be damaged when the recording head collides against the recording medium due to the impact or the like applied to the device. In this example, gold is used as the material of the main body part of the scatterer, and tungsten is used as the material of the tip portion 20. As the material of the tip portion, other metal such as molybdenum, chromium, titanium, and platinum may be used in place of tungsten.

FIG. 39 is an overall diagram of a recording device using a recording head of the present invention. A floating slider 3 is fixed to a suspension 13 and is positioned at a desired track position on a magnetic disk 14 by an actuator including a voice coil motor 49. A floating pad is formed on a head surface, and is allowed to float with a floating amount of 10 nm or less on the magnetic disk 14. The magnetic disk 14 is rotated by being fixed to a spindle 53 driven to be rotated by the motor. A semiconductor laser 55 is fixed with solder onto a sub-mount 51, and then the sub-mount 51 is disposed at the base (a portion called e-block) of an arm to which the suspension is attached. A driver of the semiconductor laser 55 is disposed on a circuit board 52 arranged next to the e-block. A driver for a magnetic head is also mounted on the circuit board 52. The sub-mount 51 having the semiconductor laser 55 mounted thereon may be disposed directly on the e-block, or may be disposed on a driver circuit board 52. Light emitted from the semiconductor laser 55 is coupled to a waveguide 10 by connecting the waveguide 10 directly to the semiconductor laser or by placing a lens between the waveguide 10 and the semiconductor laser. In this event, the waveguide 10, the semiconductor laser 55 and elements or components for connection thereof may be integrated as a module and disposed on the e-block or on the circuit board next to the e-block. The module may be hermetically sealed to extend the life of the semiconductor laser 55. Moreover, the waveguide 10 may be integrated on the suspension. That is, the waveguide may be formed simultaneously with formation of electric wires for supplying power to the magnetic head on the suspension. In this case, the semiconductor laser may be formed so that the semiconductor laser and the suspension are integrated around an input terminal of the electric wire (i.e., on a thin stainless plate having electric wires and electrodes formed on its surface).

A recording signal is generated by a signal processing LSI 54, and the recording signal and a power source for the semiconductor laser are supplied to a driver for the semiconductor laser through a flexible print circuit (FPC) 50. At the instant of recording, a magnetic field is generated by a coil provided in the floating slider 5, and light is emitted from the semiconductor laser, thereby forming a recording mark. Data recorded on the recording medium 14 is reproduced by a magnetic reproducing element (a GMR or TMR element) formed in the floating slider 5. A signal processing circuit 54 performs signal processing for a reproducing signal.

Figure 40A:
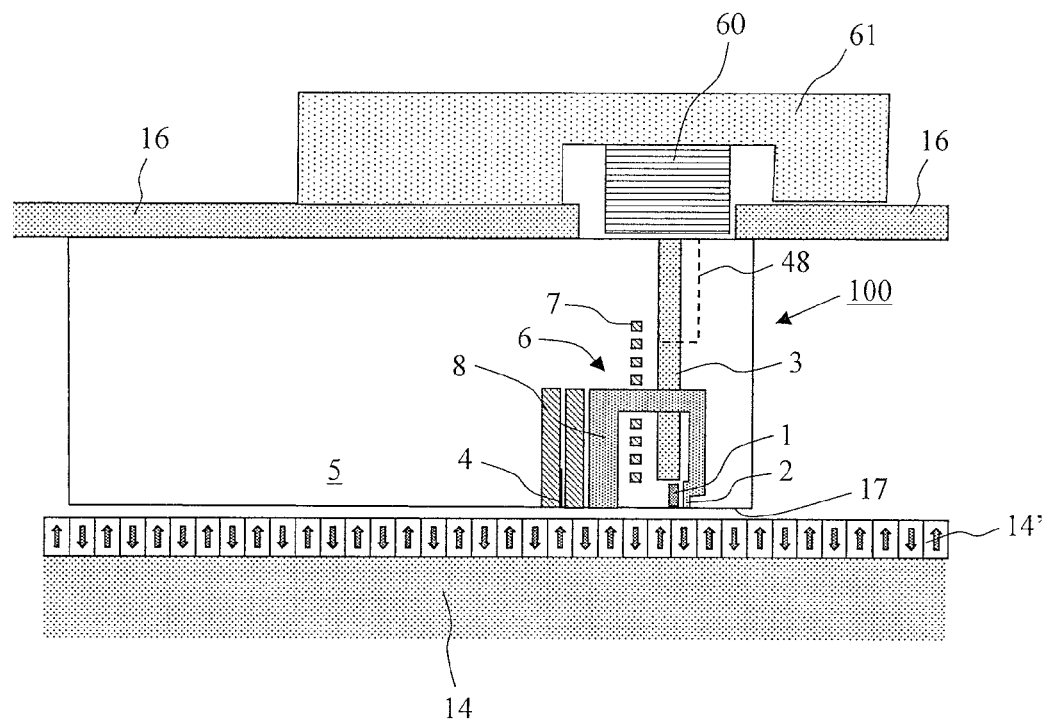
FIGS. 40A and 40B are views showing a method for introducing light, FIG. 40A showing a case where a surface-emitting laser is placed on a floating slider, and FIG. 40B showing a case of using a lens in place of a waveguide.

Although the semiconductor laser is disposed on the outside of the slider and light is guided to the slider using the optical waveguide in this embodiment, the semiconductor laser may be disposed on the slider 5 as shown in FIG. 40A. In the example shown in FIG. 40A, a substrate 61 having a surface-emitting laser 60 mounted thereon is disposed on a flexure 16 of the suspension. Light from the surface-emitting laser 60 is guided to a waveguide 3 in the slider through a hole formed in the flexure 16 of the suspension.

Figure 40B:
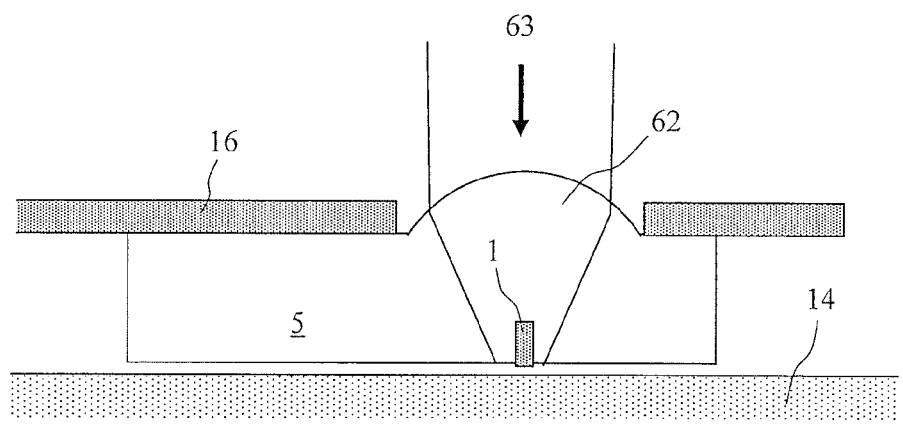

Although a scatterer is irradiated with light by using the waveguide 3 in the above example, the scatterer may be irradiated with light by using a lens as shown in FIG. 40B. In the example shown in FIG. 40B, a spherical lens 62 is formed on a slider 5 made of transparent material, and a scatterer 1 is formed at a focal position of the lens.

The optical near-field generating unit of the present invention may be used not only for a thermally assisted magnetic recording device but also for other optical devices such as an optical recording/reproducing device, a near-field optical microscope and an exposure device.

Figure 41A:
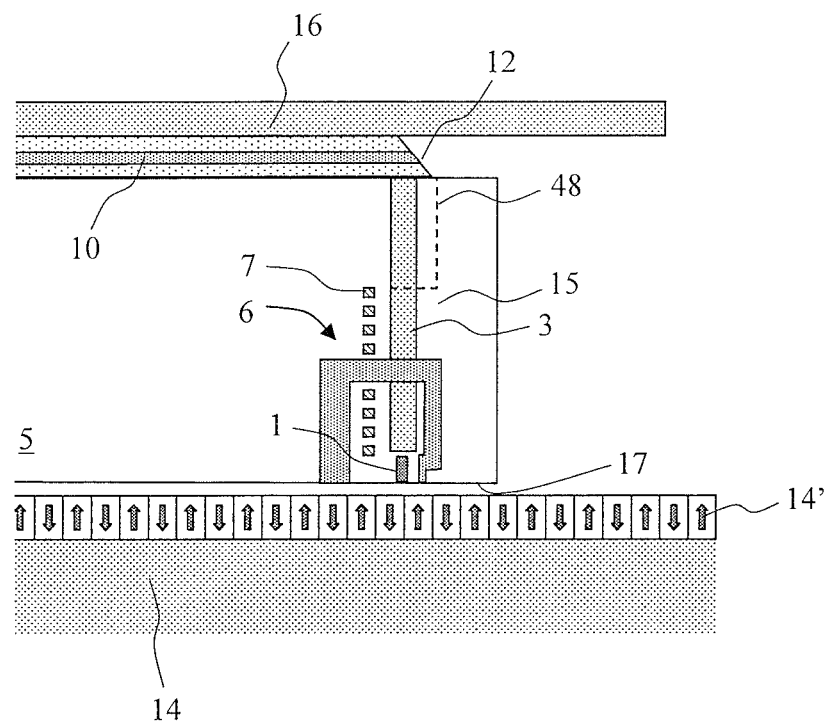
FIGS. 41A and 41B are views showing a configuration example of an optical recording/reproducing device, FIG. 41A showing an internal structure of a slider, and FIG. 41B showing an optical system installed at the base of a waveguide.
Figure 41B:
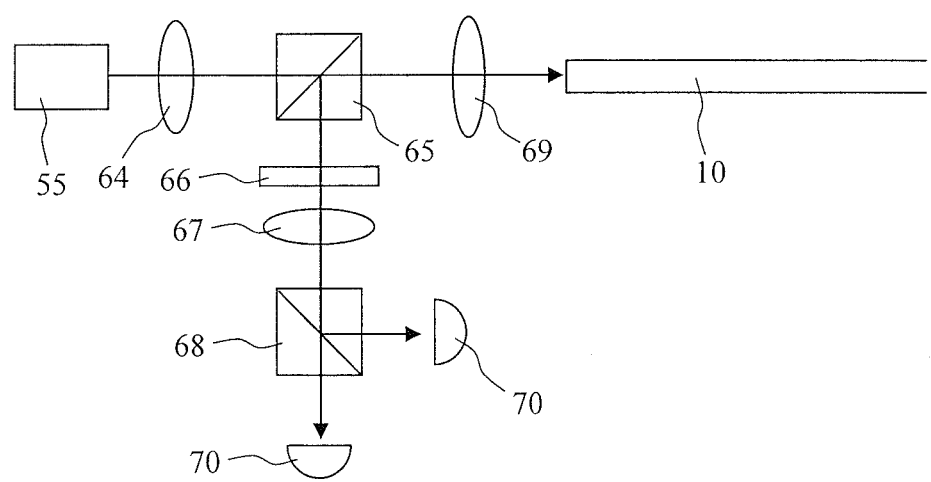

FIGS. 41A and 41B are views showing an example of using the optical near-field generating unit of the present invention for an optical recording/reproducing device. FIG. 41A shows an internal structure of a slider, and FIG. 41B shows an optical system installed at the base of a waveguide. As in the case of FIG. 1, a head obtained by forming a scatterer 1 near a magnetic head 6 is used as a recording head. In this event, no magnetic reproducing element is disposed, and recorded information is reproduced by using the optical system for optical reproducing at the base of the waveguide 10. When an optical near-field is irradiated onto a magnetic recording medium, scattering light is generated. In this event, polarization direction of the scattering light varies depending on a direction of magnetization of the medium. This rotation of the polarization direction is detected with the optical system disposed at the base of the waveguide. The light emitted from the semiconductor laser 55 is collimated into parallel light by a collimator lens 64, collected by a condenser lens 69, and then guided to the waveguide 10. Scattering light generated on a surface of the medium passes through the waveguides 3 and 10 to be emitted from the semiconductor laser side of the waveguide 10. The light is separated from incident light by a beam splitter 65. The scattering light then passes through a half-wavelength plate 66, condenser lens 67, and a polarized beam splitter 68 and is then detected by optical detectors 70. Intensity of light passing through the polarized beam splitter 68 varies in accordance with the polarization state of the scattering light. Therefore, the polarization state, i.e., the magnetized direction of the medium can be detected by detecting such variation. Accordingly, differential detecting is performed on two beams of light obtained by separation using the polarized beam splitter 68 using the two optical detectors 70. Thus, the S/N ratio is improved, Although the head having the scatterer 1 formed below the waveguide 3 is used as the recording head in the above example of optical recording/reproducing device, the one having the scatterer 1 formed at a focal point of the lens as shown in FIG. 40B may be used. Moreover, as the medium, a phase-change medium may be used instead of the magnetic medium. In this case, information is recorded by a difference between amorphous and crystalline states. When the optical near-field is irradiated onto the medium, scattering light intensity varies between the amorphous and crystalline states. The recorded information is reproduced by detecting such a difference using an optical detector.

Figure 42:
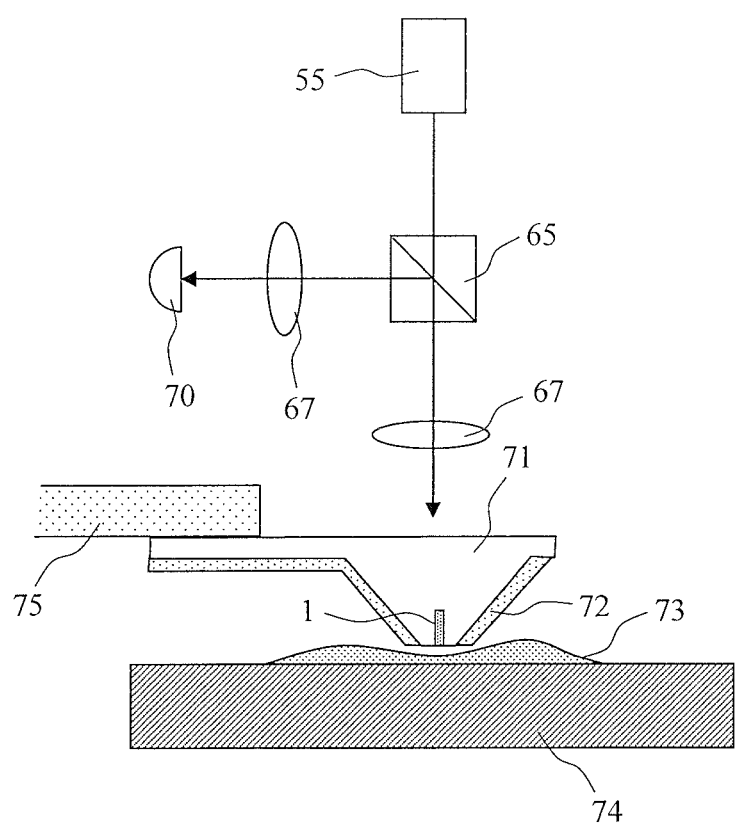
FIG. 42 is a view showing a configuration example of a near-field optical microscope.

FIG. 42 is a view showing an example of using the optical near-field generating unit of the present invention for a near-field optical microscope. A scatterer 1 is formed at a tip of an optically-transparent cantilever 71. Light generated by a semiconductor laser 55 is collected by a condenser lens 67 and introduced to the cantilever 71 attached to a holder 75. In this event, a metal film 72 is formed on the surface of the cantilever so as to collect incident light on the tip of the cantilever. When a sample 73 is irradiated with an optical near-field generated by the scatterer 1, scattering light, fluorescence, Raman scattering light or the like is generated on the surface of the sample. This light is focused through the cantilever 71 and the lens 67. A signal light from the sample is separated by a beam splitter 65 and is detected by an optical detector 70. The sample 73 is scanned in a horizontal direction by a piezo-stage 74. The shape of the sample and a distribution of fluorescence, Raman scattering light or the like are measured by monitoring a light intensity change occurring in the sample when the sample is scanned.

Figure 43:
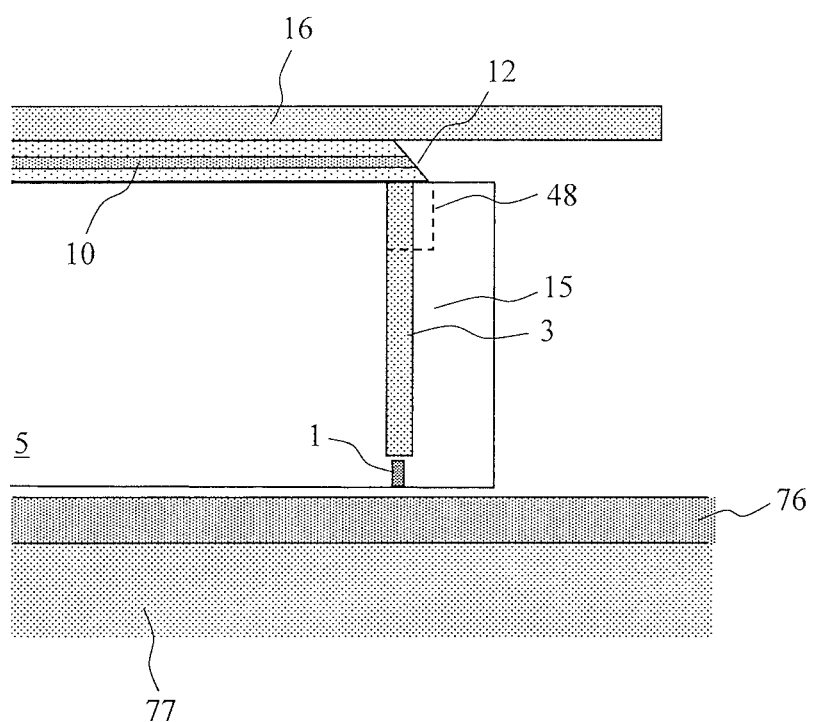
FIG. 43 is a view showing a configuration example of an exposure device.

FIG. 43 is a view showing an example of using the optical near-field generating unit of the present invention for an exposure device. A scatterer 1 and a waveguide 3 are formed in a slider 5. A photoresist 76 is applied onto a substrate 77 to be processed, and the slider 5 is brought close to the photoresist and the photoresist is scanned. In this event, the resist is exposed to the optical near-field generated by the scatterer 1. A light spot of the optical near-field is several 10 nm or less, and thus a minute pattern can be exposed.

EXPLANATION OF REFERENCE NUMERALS 1 optical near-field generator (scatterer)
2 main pole
3 waveguide core
4 reproducing element
5 slider
6 magnetic head
7 coil
8 return pole
9 shield
10 polymer waveguide
12 mirror
13 suspension
14 recording medium 14' recording layer
15 waveguide clad
16 flexure of suspension
17 slider floating surface
20 apex of scatterer
21 tapered portion of scatterer
22 lower part of scatterer
23 polarization direction of incident light
24 incident direction of incident light
25 recess on surface of scatterer
26 material of periphery of scatterer
27 pole for transmitting magnetic flux generated by coil
28 upper part of main pole
29 edge of waveguide core
30 thin soft magnetic layer
31 edge of pole tip
32 recess in pole tip
33 portion increased in width in upper part of scatterer
34 protrusion formed in lower part of portion increased in width in upper part of scatterer
35 portion in contact with floating surface in a part of protrusion formed in lower part of scatterer
36 protrusion formed in upper part of scatterer
37 portion increased in thickness and formed on both ends of scatterer
38 lower part of portion increased in width in upper part of scatterer
39 edge on center side of protrusion formed in lower part of scatterer
40 side surface of portion increased in thickness and formed on both ends of scatterer
48 spot diameter converter
49 voice coil motor
50 FPC
51 sub-mount
52 driver circuit board
53 spindle motor
54 signal processing LSI
55 semiconductor laser
56 low refractive index clad part
60 surface-emitting laser
61 substrate having surface-emitting laser mounted thereon
62 spherical lens
63 incident light
64 collimator lens
65 beam splitter
66 half-wavelength plate
67 condenser lens
68 polarized beam splitter
69 condenser lens
70 optical detector
71 cantilever
72 metal film
73 sample
74 stage
75 holder
76 resist
77 substrate
100 thermally assisted magnetic head

What is claimed is:

1. A thermally assisted magnetic recording head, comprising:
    a pole for generating a recording magnetic field;
    a conductive scatterer for generating an optical near-field; and
    a waveguide for guiding light from a light source to the scatterer, wherein
    the scatterer has a cross-sectional shape in which its width is gradually reduced toward an apex where the optical near-field is generated on at least one surface parallel to the floating surface, and
    a width of the scatterer in a direction perpendicular to a polarization direction of incident light and perpendicular to the traveling direction of the incident light is larger on the light incident side than on the side where the optical near-field is generated, wherein the polarization direction is substantially parallel to the floating surface, and
    the optical near-field is generated from the apex facing the medium at the end of the scatterer facing the pole.

2. The thermally assisted magnetic recording head according to claim 1, wherein the scatterer has a shape obtained by connecting a triangular prism-shaped lower part of the scatterer to the bottom of a tapered portion in which the width in the direction perpendicular to the polarization direction of the incident light and perpendicular to the traveling direction of the incident light is gradually reduced in a traveling direction of the incident light.

3. The thermally assisted magnetic recording head according to claim 2, wherein the tapered portion has a spread angle of not more than 65 degrees.

4. The thermally assisted magnetic recording head according to claim 2, wherein the tapered portion has a spread angle within a range between 20 and 50 degrees.

5. The thermally assisted magnetic recording head according to claim 1, wherein a distance from an incident side edge of the scatterer to the apex where the optical near-field is generated is not larger than a wavelength of the incident light.

6. The thermally assisted magnetic recording head according to claim 1, wherein a distance from an incident side edge of the scatterer to the apex where the optical near-field is generated is not more than $0.612\lambda+66$ (nm), where the wavelength is $\lambda$.

7. The thermally assisted magnetic recording head according to claim 1, wherein the scatterer has a wide portion on the light incident side.

8. The thermally assisted magnetic recording head according to claim 7, wherein a distance from the floating surface to the wide portion is within a range between $(0.039\lambda+157)\{-0.778\times(n-1.63)+1\}$ and $96.52\{-0.778\times(n-1.63)+1\}e^{0.0015\lambda}$, where the wavelength is $\lambda$, a refractive index of the material of the periphery of the scatterer is n, and the unit is nm.

9. The thermally assisted magnetic recording head according to claim 7, wherein the wide portion has a protrusion on the floating surface side.

10. The thermally assisted magnetic recording head according to claim 9, wherein a distance from the center of the scatterer to the protrusion is within a range between $(0.369\lambda+167)\{-1.33\times(n-1.63)+1\}$ and $(0.821\lambda-361)\{-1.33\times(n-1.63)+1\}$, where the wavelength is $\lambda$, a refractive index of the material of the periphery of the scatterer is n, and the unit is nm.

11. The thermally assisted magnetic recording head according to claim 9, wherein a distance from a lower end of the protrusion to the floating surface is not less than 10 nm.

12. The thermally assisted magnetic recording head according to claim 9, wherein the protrusion has a second protrusion in a part on the floating surface side, the second protrusion reaching the floating surface.

13. The thermally assisted magnetic recording head according to claim 12, wherein a distance from the second protrusion to the center of the scatterer is larger than ½ of a spot diameter of the incident light.

14. The thermally assisted magnetic recording head according to claim 7, wherein the wide portion has a protrusion on the light incident side.

15. The thermally assisted magnetic recording head according to claim 7, wherein the wide portion has a region in which a width in a direction parallel to the polarization direction of the incident light is partially increased.

16. The thermally assisted magnetic recording head according to claim 15, wherein a distance from the region in which a width in a direction parallel to the polarization direction of the incident light is partially increased to the center of the scatterer is within a range between $(0.413\lambda-127)$ $\{-0.39\times(n-1.63)+1\}$ and $(0.388\lambda+122)$ $\{-0.39\times(n-1.63)+1\}$, where the wavelength is $\lambda$, a refractive index of the material of the periphery of the scatterer is n, and the unit is nm.

17. The thermally assisted magnetic recording head according to claim 1, wherein the pole has a recess in a surface facing the scatterer, and the apex of the scatterer where the optical near-field is generated is disposed in the vicinity of the recess.

18. A thermally assisted magnetic recording device, comprising:
a magnetic recording medium;
a medium driver configured to drive the magnetic recording medium;
a light source;
a head including a pole for generating a recording magnetic field, a conductive scatterer for generating an optical near-field, and an optical system for guiding light from the light source to the scatterer; and
a head driver configured to position the head at a desired track position on the magnetic recording medium, wherein
the scatterer has a cross-sectional shape in which its width is gradually reduced toward an apex where the optical near-field is generated on at least one surface parallel to the floating surface, and the width of the scatterer in a direction perpendicular to a polarization direction of incident light and perpendicular to the traveling direction of the incident light is larger on the light incident side than on the side where the optical near-field is generated, wherein the polarization direction is substantially parallel to the floating surface, and
the optical near-field is generated from the apex facing the medium at the end of the scatterer facing the pole.

19. An optical near-field generating device, comprising:
a conductive scatterer for generating an optical near-field; and
a waveguide for guiding light from a light source to the scatterer, wherein
the scatterer has a cross-sectional shape in which its width is gradually reduced toward an apex where the optical near-field is generated on at least one surface parallel to the floating surface, and
the width of the scatterer in a direction perpendicular to a polarization direction of incident light and perpendicular to the traveling direction of the incident light is larger on the light incident side than on the side where the optical near-field is generated, wherein the polarization direction is substantially parallel to the floating surface, and
the optical near-field is generated from the apex facing the medium at the end of the scatterer facing the pole.

* * * * *